US009998248B2

(12) United States Patent
Scahill et al.

(10) Patent No.: US 9,998,248 B2
(45) Date of Patent: Jun. 12, 2018

(54) INTERFERENCE DETECTION

(71) Applicant: British Telecommunications Public Limited Company, London (GB)

(72) Inventors: Francis Scahill, London (GB); Simon Ringland, London (GB); David Townend, London (GB); Richard Evenden, London (GB)

(73) Assignee: British Telecommunications Public Limited Company, London (GB)

( * ) Notice: Subject to any disclaimer, the term of this patent is extended or adjusted under 35 U.S.C. 154(b) by 0 days. days.

(21) Appl. No.: 15/515,028

(22) PCT Filed: Sep. 29, 2015

(86) PCT No.: PCT/EP2015/072490
§ 371 (c)(1),
(2) Date: Mar. 28, 2017

(87) PCT Pub. No.: WO2016/050808
PCT Pub. Date: Apr. 7, 2016

(65) Prior Publication Data
US 2017/0272194 A1    Sep. 21, 2017

(30) Foreign Application Priority Data

Sep. 30, 2014   (EP) .................................... 14250110
Sep. 30, 2014   (EP) .................................... 14250111
Sep. 30, 2014   (EP) .................................... 14250112

(51) Int. Cl.
*H04J 11/00*   (2006.01)
*H04L 29/12*   (2006.01)
(Continued)

(52) U.S. Cl.
CPC ........ *H04J 11/005* (2013.01); *H04L 61/6022* (2013.01); *H04W 84/042* (2013.01); *H04W 84/12* (2013.01); *H04W 88/16* (2013.01)

(58) Field of Classification Search
CPC ... H04J 11/005; H04L 61/602; H04W 84/042; H04W 84/12; H04W 88/16
(Continued)

(56) References Cited

U.S. PATENT DOCUMENTS 8,792,361 B2    7/2014  Croot et al.
2008/0274745 A1   11/2008  Barak et al.
(Continued)

FOREIGN PATENT DOCUMENTS

WO    WO 2012/093349 A2   7/2012
WO    WO2016/050805 A1    4/2016
WO    WO2016/050807 A1    4/2016

OTHER PUBLICATIONS

International Preliminary Report on Patentability, for PCT/EP2015/072487, dated Apr. 4, 2017, 7 pages.
(Continued)

*Primary Examiner* — Obaidul Huq
(74) *Attorney, Agent, or Firm* — Amy M. Salmela; Patterson Thuente Pedersen, P.A.

(57) ABSTRACT

A management server for managing a population of wireless access point devices by detecting out-of-band interference to the operation of the wireless access point Wi-Fi networks caused by LTE small cell devices such as macrocells and femtocells. A flow processor monitors the characteristics of data flows of devices connected to the wireless access point to determine whether they are LTE cells based on MAC address matching or the termination of a flow at a known mobile network operator gateway. A mitigation action to change the operational behavior of the wireless access point
(Continued)

is then generated and applied to mitigate the effect of the detected interference device on the Wi-Fi network. The management server further determines, using a data store containing the location of the wireless access points, whether other wireless access points will be affected by the presence of the interference device and sends mitigation actions to potentially affected devices.

13 Claims, 15 Drawing Sheets

(51) Int. Cl.
  *H04W 84/04* (2009.01)
  *H04W 84/12* (2009.01)
  *H04W 88/16* (2009.01)

(58) Field of Classification Search
  USPC .................................................. 370/241, 252
  See application file for complete search history.

(56) References Cited

U.S. PATENT DOCUMENTS

| | | | |
|---|---|---|---|
| 2010/0284381 A1 | 11/2010 | Hirsch | |
| 2010/0296487 A1 | 11/2010 | Karaoguz et al. | |
| 2011/0170424 A1 | 7/2011 | Safavi | |
| 2011/0268044 A1* | 11/2011 | Yun | H04W 24/00 370/329 |
| 2011/0274101 A1 | 11/2011 | Cooper | |
| 2012/0094660 A1 | 4/2012 | Radulescu et al. | |
| 2012/0252440 A1* | 10/2012 | Watanabe | H04W 24/02 455/423 |
| 2013/0012249 A1* | 1/2013 | Centonza | H04W 72/0426 455/501 |
| 2013/0017794 A1 | 1/2013 | Kloper et al. | |
| 2013/0272285 A1 | 10/2013 | Goldsmith et al. | |
| 2013/0281089 A1 | 10/2013 | Chandrasekhar et al. | |
| 2014/0036691 A1 | 2/2014 | Madan et al. | |
| 2014/0169200 A1 | 6/2014 | Woo | |
| 2014/0233416 A1 | 8/2014 | Black et al. | |
| 2014/0376426 A1 | 12/2014 | Boudreau et al. | |
| 2015/0105067 A1 | 4/2015 | Valliappan et al. | |
| 2015/0146548 A1 | 5/2015 | Wang | |
| 2017/0171870 A1 | 6/2017 | Wang et al. | |
| 2017/0264487 A1 | 9/2017 | Scahill et al. | |
| 2017/0272966 A1 | 9/2017 | Scahill et al. | |

OTHER PUBLICATIONS

International Preliminary Report on Patentability, for PCT/EP2015/072489, dated Apr. 4, 2017, 8 pages.
International Search Report for corresponding International Application No. PCT/EP2015/072490 dated Feb. 1, 2016; 3 pages.
Written Opinion of the International Searching Authority for corresponding International Application No. PCT/EP2015/072490 dated Feb. 1, 2016; 6 pages.
International Search Report for related International Application No. PCT/EP2015/072489 dated Dec. 7, 2015; 3 pages.
Written Opinion of the International Searching Authority for related International Application No. PCT/EP2015/072489 dated Dec. 7, 2015; 7 pages.
International Search Report for related International Application No. PCT/EP2015/072487 dated Dec. 7, 2015; 3 pages.
Written Opinion of the International Searching Authority for related International Application No. PCT/EP2015/072487 dated Dec. 7, 2015; 6 pages.
U.S. Appl. No. 15/514,994, filed Mar. 28, 2017, inventor Scahill.
U.S. Appl. No. 15/515,059, filed Mar. 28, 2017, inventor Scahill.

* cited by examiner

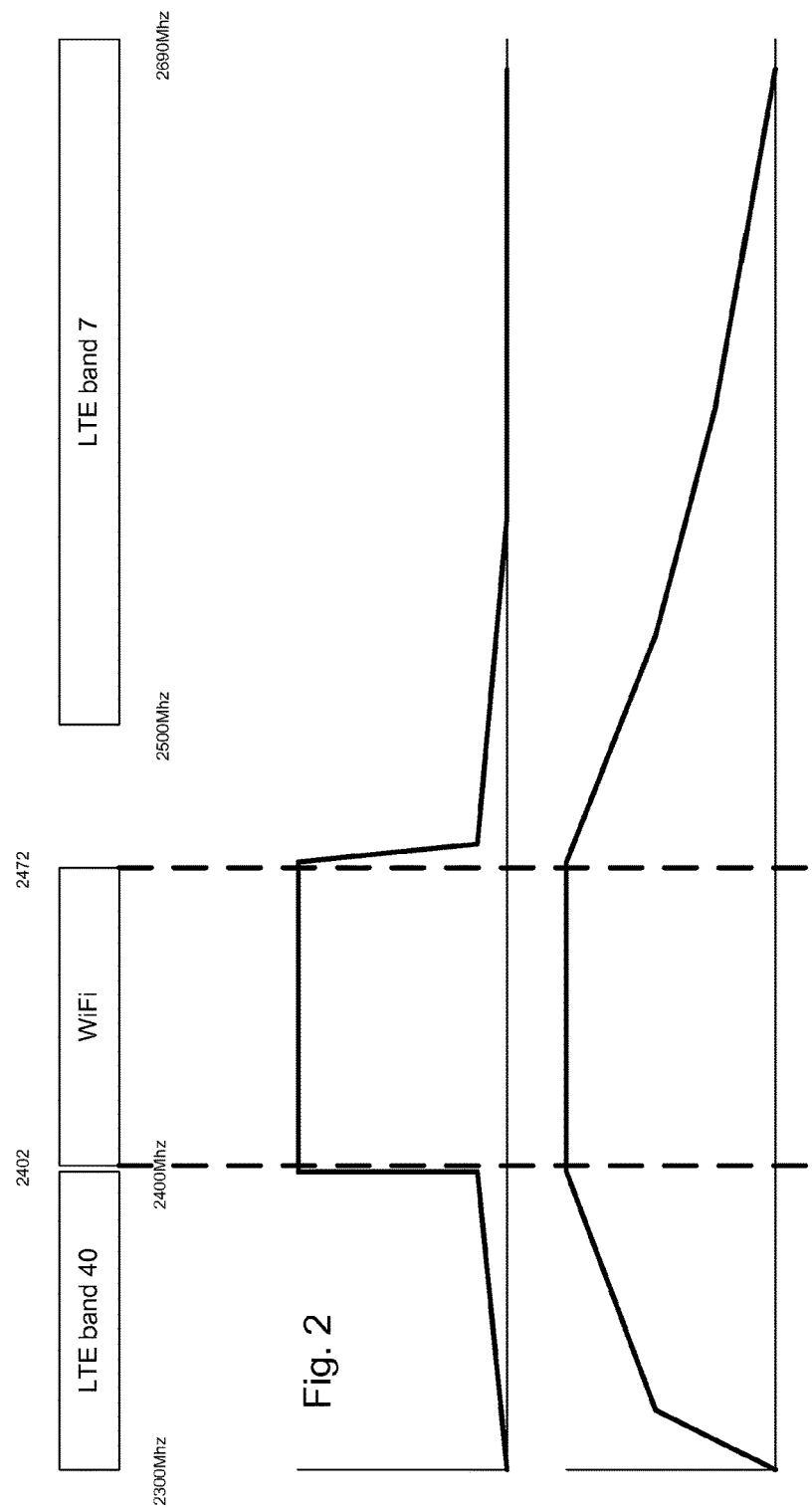

INTERFERENCE DETECTION

CROSS-REFERENCE TO RELATED APPLICATIONS

The present application is a National Phase entry of PCT Application No. PCT/EP2015/072490, filed on 29 Sep. 2015, which claims priority to EP Patent Application No. 14250110.5, filed on 30 Sep. 2014, and to EP Patent Application No. 14250112.1, filed on 30 Sep. 2014, and to EP Patent Application No. 14250111.3, filed on 30 Sep. 2014, which are hereby fully incorporated herein by reference.

TECHNICAL FIELD

The present disclosure relates to wireless communications and in particular to a method and apparatus for detecting the presence of potential interference sources and taking mitigating action.

BACKGROUND

In wireless communications, the IEEE 802.11 family of standards relating to "Wi-Fi" is now a popular system for allowing devices to communicate wirelessly using radio wave transmission. Groups of devices all communicating via a common wireless access gateway are known as wireless local area networks (WLANs).

Wi-Fi communication is licensed to operate in two sections of radio spectrum, 2.4 Ghz and 5 Ghz. At present, most devices are only able to operate in the popular 2.4 Ghz spectrum band, while more recent devices can also operate in the 5 Ghz band which is generally less congested.

In 2.4 Ghz Wi-Fi, the spectrum between 2402 Mhz and 2472 Mhz has been divided into a number of channels, each channel has a central frequency spaced 5 Mhz apart from its neighboring channel. However there is spectra overlap such that transmissions on channel 1 will interfere with transmissions on channel 2, 3, 4, 5, while transmissions on channel 2 will interfere with transmissions on channels 1 and 3, 4, 5, 6, etc.

Since there is no central controller for handling collisions in Wi-Fi, WLAN devices use a protocol known as Carrier Sense, Multiple Access with Collision Avoidance (CSMA) so that only a single device is transmitting at any one time.

CSMA is a listen-before-talk approach that attempts to determine whether any other transmitter is operating in the Wi-Fi band. In addition Wi-Fi devices uses a variety of proprietary modulation rate adaption algorithms that varying the modulation and coding in accordance with the Signal to noise ratio of the channel. Both CMSA and rate adaption are dependent on the received noise level which includes interference from other non-Wi-Fi transmitters.

In particular, the recent emergence of LTE femtocells operating in the 2.3 GHz and 2.6 Ghz spectrum bands has resulted in the potential for more interference in the form of out of band interference that can cause subtle effects on Wi-Fi performance and range that are not easily detected by the Wi-Fi devices and which can affect Wi-Fi devices in different ways. For example, out-of-band interference can interfere with the automatic gain control of Wi-Fi receivers resulting in reduced sensitivity.

For example, LTE Band 7 and Band 40 lie on either side of the 2.4 Ghz Wi-Fi spectrum with relatively small frequency guard bands of <30 Mhz. For some Wi-Fi receivers, in particular older hardware released when the surrounding spectrum was not generally used, having poor out-of-band rejection, LTE transmissions in these bands can result in adjacent channel interference affecting Wi-Fi throughput. The main effect is to cause a reduction in the Wi-Fi receiver sensitivity resulting in reduced Wi-Fi range and reduced throughputs at range. In a worse case, i.e. where the LTE transmit power is high, e.g. >15 dBm and the LTE transmitter is close to the Wi-Fi station (e.g. <1 m) then the LTE transmissions can raise the noise floor above the carrier sense threshold such that the Wi-Fi transmitter cannot perceive the channel as idle and so can never transmit which may result in disruption to, and possible disconnection of the Wi-Fi link.

SUMMARY

The present disclosure is concerned with reducing the effect of interference on connected devices caused by nearby non-Wi-Fi devices.

In one aspect, the present disclosure provides a method of managing a wireless access point device having a local network interface for wireless and wired connections via a respective wireless network and wired network, and an interface to remote networks, the wireless access point being connected to at least one client device via the local network interface, the method comprising: monitoring characteristics of flows of data of packets travelling between the at least one client device and a remote resource located on a remote network, determining whether said at least one client device is an interference device which can affect a wireless network environment of the wireless access point; sending instructions to alter a configuration of the wireless access point in response to a determination that an interference device is present; determining whether the interference device can affect a wireless network of a second wireless access point, the determination based on the distance between the wireless access point and the second wireless access point; and sending instructions to alter a configuration of the second wireless access point if the determination that the interference device can affect a wireless network of the second access point is made.

In another aspect, the present disclosure provides an apparatus for managing a wireless access point device having a local network interface for wireless and wired connections via a respective wireless network and wired network, and an interface to remote networks, the wireless access point being connected to at least one client device via the local network interface, comprising: means for monitoring characteristics of flows of data of packets travelling between the at least one client device and a remote resource located on a remote network, interference determining means for determining whether said at least one client device is an interference device which can affect a wireless network environment of the wireless access point; means for sending instructions to alter a configuration of the wireless access point in response to a determination that an interference device is present; neighbor determining means for determining whether the interference device can affect a wireless network of a second wireless access point, the determination based on the distance between the wireless access point and the second wireless access point; and wherein the sending means is further operable to send instructions to alter a configuration of the second wireless access point if the neighbor determining means determines that the interference device can affect a wireless network of the second access point.

BRIEF DESCRIPTION OF THE DRAWINGS

Embodiments of the present disclosure will now be described with reference and aided by the following figures in which:

FIG. 2 illustrates an ideal frequency filter which cuts out non-Wi-Fi frequencies.

FIG. 3 illustrates a typical frequency filter found in Wi-Fi equipment shown in FIG. 1 which does not block transmissions outside of the Wi-Fi frequencies.

DESCRIPTION

In the first embodiment, in order to detect potential sources of out-of-band interference, IP traffic flows are analyzed to identify equipment and/or network locations which are known to be associated with LTE transmissions. Examples of such detections include LTE transmitter equipment or the IP address of an LTE network's gateway servers.

Figure 1:
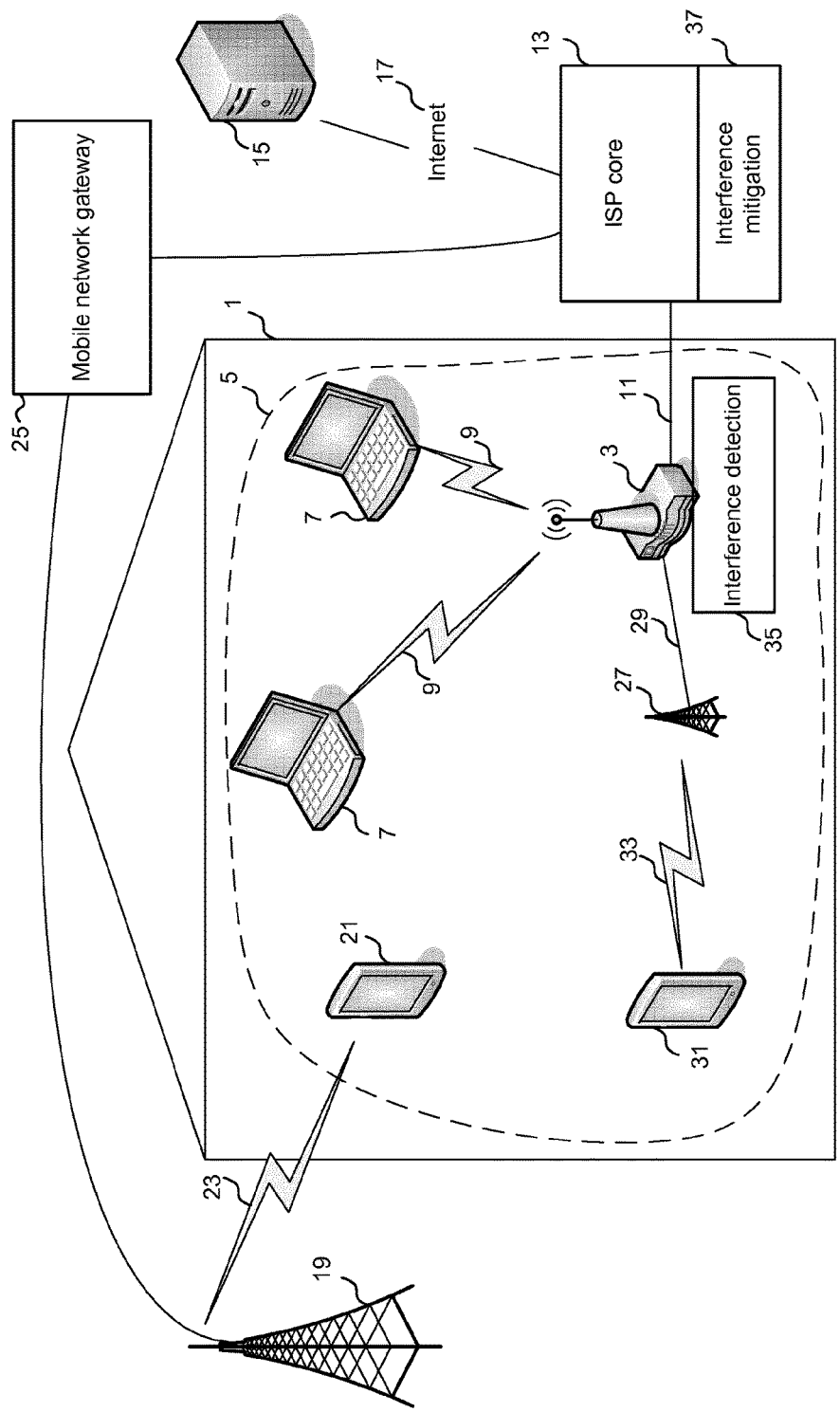
FIG. 1 illustrates an overview of a network system in accordance with a first embodiment.

FIG. 1 illustrates an overview of a network system in accordance with a first embodiment. A user's home 1 or other local network environment is shown containing a number of networking components. A wireless access point 3 such as a BT Home Hub or other similar routing device provides a wireless network (WLAN) 5 to enable data connectivity between a number of user devices 7 such as laptops, computers, smartphones and tablets within the home network environment. In FIG. 1, the wireless access point 3 and user devices 7 within range of the WLAN 5 are wirelessly linked using the IEEE 802.11 family of wireless protocols more commonly known as Wi-Fi. The WLAN 5 is configured to have a star topology in which each device 7 in the network 5 is wirelessly connected to the wireless access point 3 via a Wi-Fi link 9. Due to the transmission power and propagation limitations of Wi-Fi, the range of the wireless network 5 formed by the wireless access point 3 extends for several meters around the wireless access point 3 and data connectivity is generally limited to being within the home 1.

As is conventional, to enable communication between the devices connected to the WLAN 5 and external services not forming part of the WLAN 5, the wireless access point 3 also has a copper/optical fiber data link 11 operating in accordance with the Very-High-Bitrate Digital Subscriber Line (VDSL) standards. The copper/optical fiber data link 13 connects the wireless access point 3 to an Internet Service Provider (ISP) core network 13. The ISP 13 network core provides user management and control features for the user's account and also forwards data packets between user devices 7 and remote devices 15 located on external networks such as the Internet 17.

In addition to Wi-Fi, some user mobile devices can also use cellular networks provided by mobile network operators to access remote devices 15 located on the Internet 17. Third generation and fourth generation cellular technologies such as High Speed Packet Access (HSPA), Long Term Evolution (LTE) and Long Term Evolution Advanced (LTE-A) are typically used to provide radio access network functions. eNodeBs 19 are located across a geographic area to define cells spanning several square kilometers in the mobile network operator's network (not shown) and since eNodeBs have high transmission powers and can use a range of transmission frequencies, cellular networks can provide wide area data connectivity and therefore extend into the user's home 1. The eNodeBs are connected to a mobile network operator gateway 25 of the mobile network. In FIG. 1, a further user device 21 is located within the home 1 but is connected to the LTE network eNodeB 19 via a LTE cellular data link 23 instead of the wireless access point 3 via Wi-Fi. In this embodiment, this LTE network operates at the 2.6 Ghz frequency channel.

Since LTE cellular macrocells must cover large geographic areas, the signal quality to a mobile device varies in dependence upon the natural terrain and man-made structures that surround a cellular device that is connected to a macrocell. To address this, network operators can use shorter range and lower power LTE devices known as small cells which transmit using LTE wireless protocols over a small geographic range and wireless data is tunneled over a user's broadband connection to the mobile network operator network. The term small cell devices includes devices such as picocells, femtocells and hence is an umbrella term for short range and low transmission power cell offload devices which provide a cellular signal and backhaul data to the mobile network via a user's broadband connection.

FIG. 1 also shows a LTE femtocell device 27 connected to the wireless access point 3 via a wired Ethernet data link 29. The femtocell 27 is configured to provide LTE connectivity to LTE user devices and in FIG. 1 a further user device 31 is connected to the femtocell 27 over a LTE cellular data link 33. In this embodiment, this LTE femtocell 27 operates at the 2.3 Ghz frequency channel.

The LTE device 31 communicates with the femtocell 27 using LTE protocols rather than Wi-Fi and the LTE femtocell 27 communicates with the mobile network gateway 25 via the wireless access point 3 and ISP core 13.

In the environment shown in FIG. 1, there are two types of overlapping wireless networks operating under different protocols and slightly different frequencies. Firstly there is a Wi-Fi network 5 operating at the 2.4 Ghz frequency range, and secondly LTE networks operating at the licensed spectrum bands of 2.6 Ghz and 2.3 Ghz, respectively.

The physical and spectral proximity of the LTE spectrum operating frequencies to the Wi-Fi operating frequency can result in interference, especially to the Wi-Fi transmissions. Cellular devices supporting the 2.3 Ghz and 2.6 Ghz typically contain frequency filters which allow 2.3 Ghz and 2.6 Ghz signals to pass through to the receiver while blocking signals operating outside of the usable frequency bands. At the design stage, high quality filters are specified due to the spectral proximity of the 2.4 Ghz band which is known to be used for Wi-Fi. Therefore LTE devices 21, 31 are generally not affected by Wi-Fi cross talk.

However, Wi-Fi equipment, and especially legacy Wi-Fi equipment, is especially prone to this type of interference since the bandpass filters may be inadequate for isolating the 2.4 Ghz Wi-Fi spectrum from 2.3 Ghz (LTE band 40) and 2.6 GHz (LTE band 7) LTE transmissions (which were unused at the time such legacy equipment was manufactured).

FIG. 2 shows the ideal response of a bandpass filter installed in a Wi-Fi device to prevent signals outside of the Wi-Fi spectrum from interfering. In this ideal case, Wi-Fi frequency signals incur very little attenuation, while frequencies outside the Wi-Fi frequency range are heavily attenuated so that any transmission power in these bands is not likely to affect the Wi-Fi signal. However, such a precise filter is typically expensive to implement due to the sharp cut off performance requirements adding cost to the equipment.

FIG. 3 shows an example "real world" frequency response of a filter typically installed in a wireless access point 3. In such a filter, the filtering effect only falls away gradually resulting in a significant amount of radio frequency energy from surrounding frequency ranges being received at the wireless access point 13. Therefore transmissions in the neighboring frequency bands would be received at the wireless access point 3 and could have an interfering effect on the wireless access point 3 performance.

Newer wireless devices e.g. access points 3 may be able to tolerate the presence of potential interference from transmissions in neighboring frequency ranges by using higher performance filters to reduce the effect of the interferers. However, older wireless access points (especially those produced before the proposals for LTE bands were proposed) typically have filters which cannot block neighboring frequencies due to production and cost constraints. Furthermore, it is not possible to upgrade existing legacy hardware to improve the filter performance, especially in the case of wireless devices having internal highly integrated receiver implementations and antennae.

Even though the two wireless communication protocols are not directly interfering by using the same frequencies, the general effect is that the LTE transmissions interfere with the automatic gain controls of Wi-Fi devices. LTE transmissions "leaking" into the Wi-Fi domain will be interpreted by Wi-Fi devices as high background noise and therefore these devices may alter the automatic gain control behavior of their receivers. Low signal to noise ratios can cause the Wi-Fi device to fail to decode received packets or cause the Wi-Fi device and its peers to adopt lower modulation complexity all of which will lower the throughput capacity of the channel. At very high levels the background noise can cause the Wi-Fi device to fail to transmit altogether. However, since LTE transmissions are typically bursty by nature rather than long term, as soon as the LTE transmitter stops, the Wi-Fi devices may have an over cautious modulation rate control which reduces its operating capacity for longer periods than the actual LTE transmission.

To address this problem, the hub 3 includes an interference detection component 35 and the ISP core contains an interference mitigation component 37. As will be described below, these two components interact to detect potential LTE devices which are connected to the wireless access point 3 and that may cause interference to the Wi-Fi home network 5. After such devices have been detected, the interference mitigation component 37 determines a course of action for mitigating or otherwise reducing the effect of the LTE interference caused by the femtocell 27. In this embodiment, the interference detection component is a function of the hub 3 and the interference mitigation component 37 is a server located within the network core 13.

Overall Operation

Figure 4:
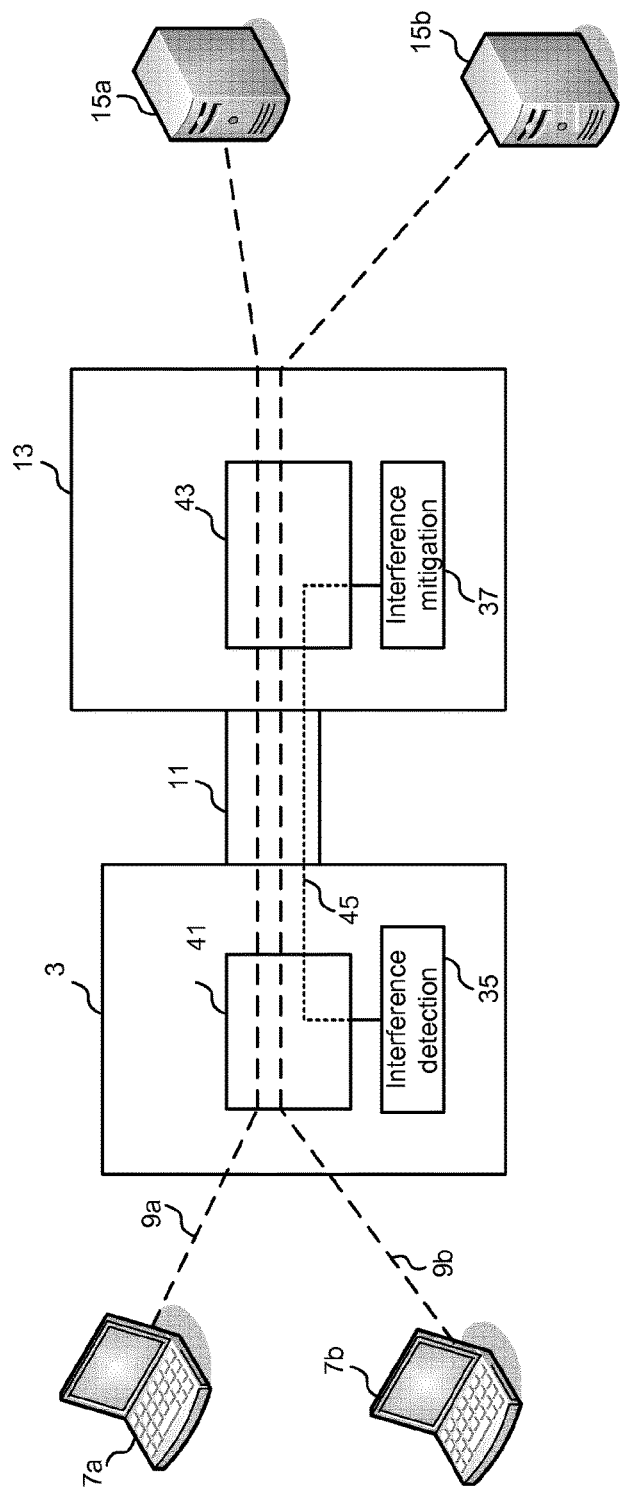
FIG. 4 illustrates a sample network when no interference sources are present.

An example of the operation of the system will now be described. FIG. 4 shows a data flow diagram based on the setting shown in FIG. 1 before the LTE femtocell 27 has been added onto the network 1. In FIG. 1, data is being transmitted between user devices 5 and remote servers 15 via the wireless access point 3 (hereinafter referred to as a "hub" 3) which contains an interference detection component 35 according to the first embodiment and the ISP network core 13 which also contains an interference mitigation component 37 according to the first embodiment.

A first data flow 9a exists between device 7a and remote server 15a and a second data flow 9b exists between device 7b and remote server 15b. The data flows both traverse a packet router 41 of the hub 3, the WAN link 11 to the ISP core 13 and are routed by a network gateway 43 which directs packets via an external network to the remote servers 15a, 15b.

In this embodiment, the interference detection component 35 of the hub 3 and the interference mitigation component 37 located at the network core 13 function to monitor for LTE devices which are connected to the hub 3 which may be potential interferers to Wi-Fi performance and to alter the operation of the hub so that the effect of such mitigation is mitigated. The interference detection component 35 generates flow information relating to IP flows being carried by the hub 3 and analyzes the IP flow information to identify any devices currently connected to the hub which may cause interference to the Wi-Fi performance of the WLAN 5. The identification is based on matching attributes of connected devices/flows against a list of characteristic information.

The attributes relating to each IP flow include:
Local device MAC address;
Local device IP address;
Local device IP port;
Remote device MAC address;
Remote device IP Address;
Remote device IP Port;
Network protocol;
Data metrics; and
Timestamps.

The interference mitigation component 37 provides the matching information used by the interference detection component 35 and is responsible for selecting a mitigation action when a source of interference is detected by the interference detection component 35. During operation a data link 45 is present between the interference detection component 35 and the interference mitigation component 37.

In FIG. 4, the interference detection component 35 may determine that there are three data flows, two between the device 9a and remote server 15a, two different services, as well as a further flow between device 9b and 15b.

In the example of FIG. 4, the processing of the interference detection component determine that there are no data flows on the WLAN 5 which are indicative of interference.

Figure 5:
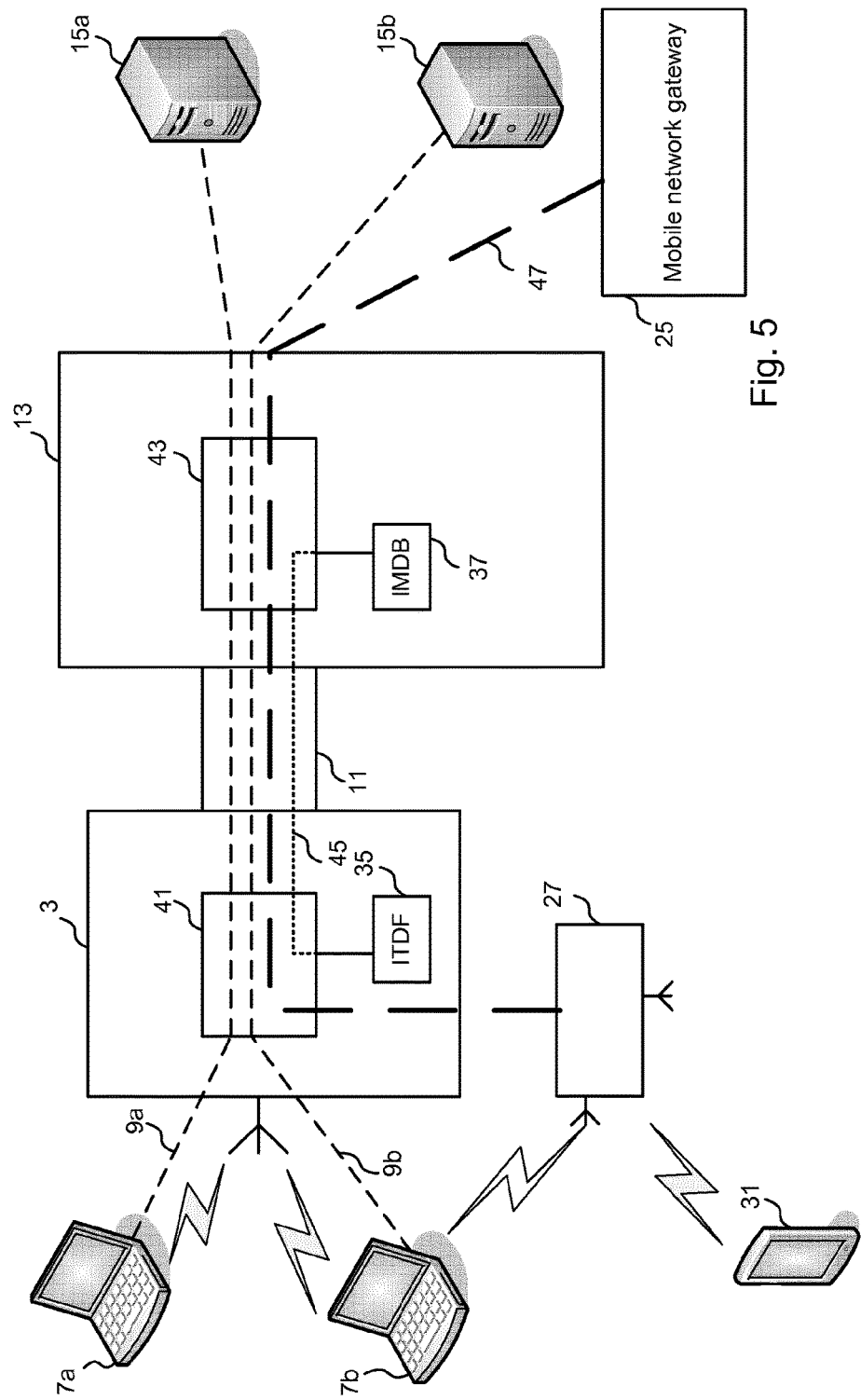
FIG. 5 illustrates the sample network when an LTE femtocell is added to the network.

FIG. 5 shows the network 1 shown in FIG. 4 after the LTE femtocell 27 has been connected to the hub 3 via the Ethernet interface 29. The femtocell 27 provides a short range cellular data link 33 to LTE mobile devices such as LTE enabled mobile phones 31 over a short range of several meters, for example within a house. Data transmitted between the LTE mobile phone 31 and the femtocell 27 is then further forwarded via the hub 3 and the ISP core to the mobile network gateway 25 to access the mobile network core and other external services.

The LTE femtocell 27 is operating in the 2.3 Ghz spectrum, and therefore can cause interference to nearby Wi-Fi devices such as the hub 3 and mobile devices 7a and 7b due to the physical proximity of the LTE and Wi-Fi devices 27, 3, 7 and the proximity of the spectrum ranges used by the two wireless protocols.

In accordance with the first embodiment, the interference detection function 35 is configured to monitor the devices which are connected to the hub 3 and in particular to monitor the data flows being carried by the hub 3 between devices.

As shown in FIG. 5, with the addition of the LTE femtocell 27 which is connected to the mobile network gateway 25, the interference detection component 35 will determine that there is a new data flow 47 being carried by the hub.

The interference detection component 35 then compares the list of all flows against matching criteria. Example matching criteria may include MAC addresses of known LTE femtocells or IP addresses of known mobile network gateways.

In FIG. 5 the flow attributes of flow 47 match and therefore the interference detection component 35 can identify LTE femtocell 27, which is the device corresponding to the local IP address of flow 47, as being a source of potential interference to Wi-Fi devices also connected to the hub 3.

Having made this determination, the interference detection function 35 sends information relating to the LTE femtocell 27 to the interference mitigation component 37 via data link 45. The interference mitigation component 37 receives and analyzes the received information to determine a suitable mitigation action to be carried out by the interference detection function 35 and hub 3 to reduce or eliminate the interference caused by the LTE femtocell 27 to the other Wi-Fi devices 3, 9.

In the example shown in FIG. 5, the interference mitigation component 37 receives a message from the interference detection component 35 containing information relating to the LTE femtocell 27. The interference mitigation component 37 determines properties of the LTE femtocell. For example determining the manufacturer of the LTE femtocell 27 from the MAC address of the LTE femtocell 27. Furthermore the IP address of the mobile network gateway 25 indicates the mobile network operator from which the spectrum allocations can be determined. The distribution of downlink and uplink packets can also be used to identify a Time Division Duplexing (TDD) LTE from a Frequency Division Duplex (FDD) LTE network. From this determination, the interference mitigation component 37 obtains information that the LTE femtocell 27 is operating in the 2.3 Ghz range.

The interference mitigation component 37 consults a mitigation list which specifies that the preferred resolution would be to reconfigure the hub 3 to use a Wi-Fi channel which is spectrally further away from the 2.3 Ghz spectrum used by the LTE femtocell 27. The hub 3 is therefore instructed to switch to Wi-Fi channel 11 which has a central frequency of 2.462 Ghz. Some hubs 3 are configured to select a channel using their own smart channel detection systems, however, the mitigation action causes this usual behavior to be overridden.

Description of Components

Figure 6:
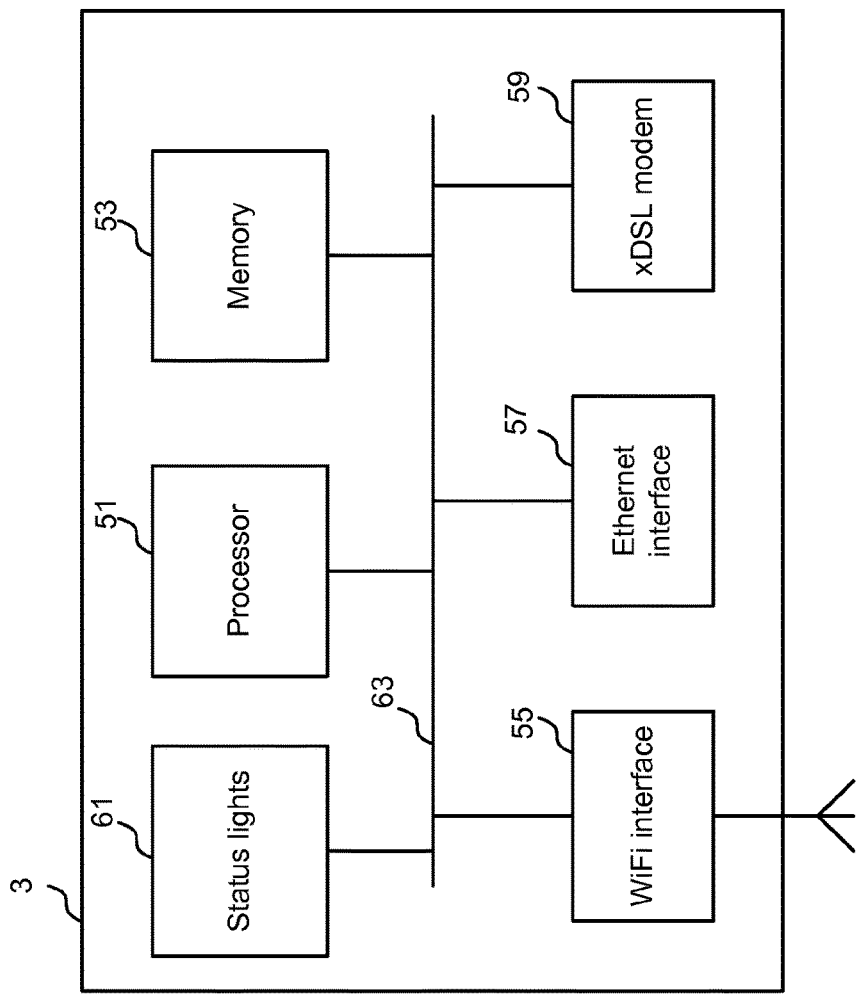
FIG. 6 illustrates the physical components of the wireless access point shown in FIG. 1.

FIG. 6 shows the physical components of a wireless access point 3 in the first embodiment. The wireless access point 3 contains a processor 51 and a memory 53 for internal processing and hub functions. For external connectivity, the wireless access point has a Wi-Fi wireless interface 55 and a wired Ethernet interface 57 for communication with other local devices within the home network 5 and a WAN interface 59 for communication with remote devices via the ISP core 13, in this embodiment the WAN interface 59 is a VDSL modem. For displaying information to the user of the wireless access point 3, the wireless access point also has a set of status lights 61. The components are connected via a system bus 63.

To perform the processing according to the first embodiment, the memory 53 of the wireless access point 3 contains program instructions which are executable by the processor 51 to define a number of functional software units. When these instructions are being executed, the wireless access point 3 can be regarded as containing a number of functional units for collecting and processing data in accordance with the first embodiment.

Figure 7:
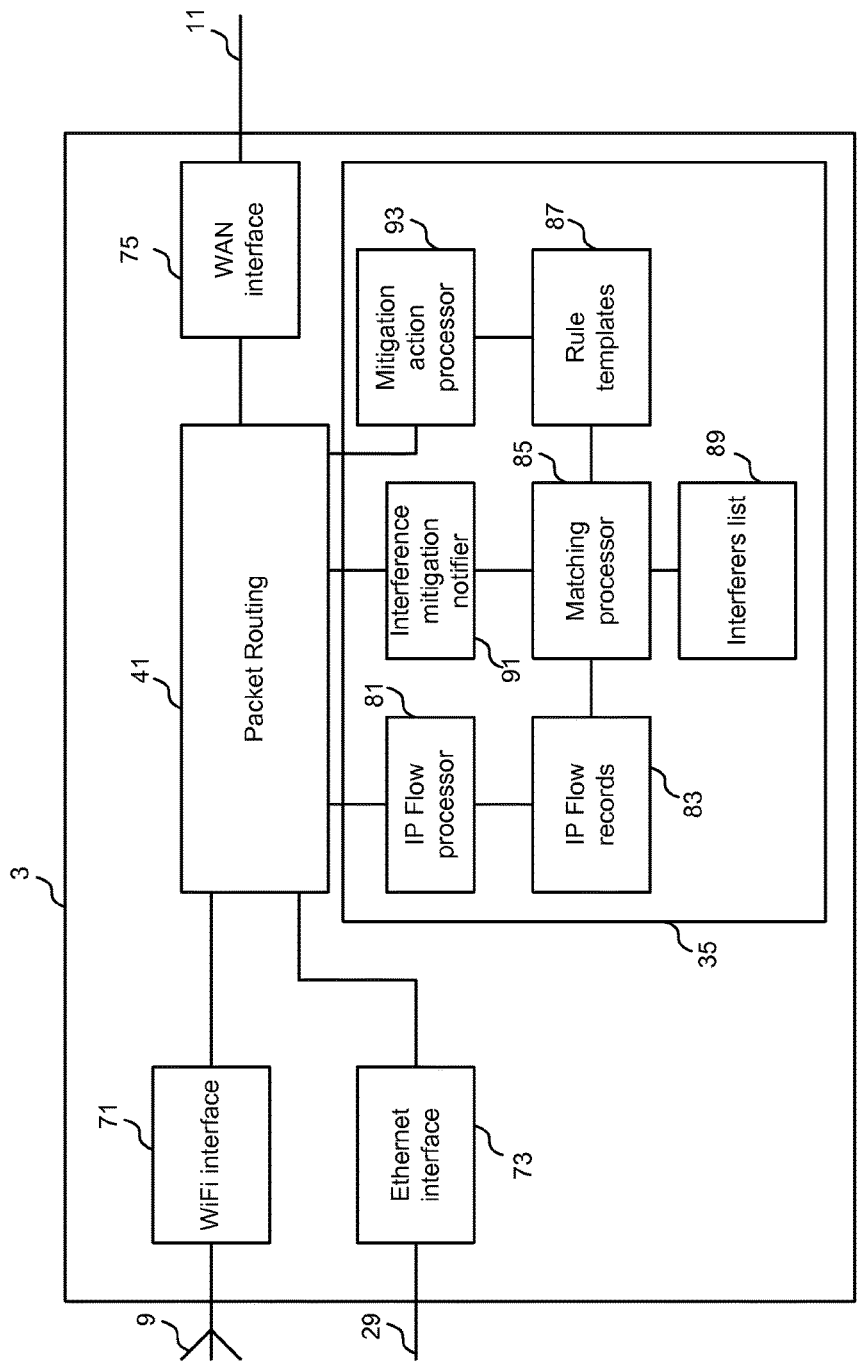
FIG. 7 illustrates the functional components of the wireless access point.

FIG. 7 shows the functional components of the wireless access point 3. For external connections, the wireless access point 3 has a Wi-Fi interface 71, an Ethernet interface 73 and a WAN interface 75 each containing the hardware and software functionality corresponding to the physical Wi-Fi interface 55, Ethernet Interface 57 and xDSL modem 59 respectively. The packet routing function 41 routes packets between the different interfaces.

In the first embodiment, the wireless access point 3 further includes the interference detection component 35 for the monitoring and detection of any potential interferers and performing mitigation actions as instructed by the interference mitigation function 37.

The interference detection component 35 includes an IP Flow processor 81, a store for the IP flow records 83. Additionally, there is a matching processor 85, a data store for rule templates 87 and a data store containing a list of previously matched interferers 89. An interference notifier 91 sends the interference mitigation component 37 details of any identified interferers and after processing by the interference mitigation component 37, the wireless access point 3 receives instructions from the interference mitigation component 37 relating to mitigation actions based on the observed IP flows. A mitigation action processor 93 is provided to receive instructions via the WAN interface 75 and apply the instructions to various parts of the hub 3 in order to mitigate the detected interference.

The IP Flow processor 81 is a component for analyzing the packets travelling across the packet routing to group them into sets based on, among other parameters, their source and destination. The detected flows are stored in the flow record store 83.

For the example situation shown in FIG. 4 where the LTE femtocell 27 is not present, the set of active flow data collected by the IP flow processor and stored in the flow record store 83 may be as follows:

| Flow ID | Src IP | Src Port | Dest IP | Dest Port | Proto | Src MAC | Total Flow Bytes | Total Flow Packets | Timeout of most recent packet |
|---|---|---|---|---|---|---|---|---|---|
| 1 | 192.168.1.128 | 8000 | 173.194.41.76 | 80 | 6 | 00:00:00:01:01:01 | 10000 | 100 | 233456789 |
| 2 | 192.168.1.34 | 4333 | 132.146.70.61 | 1701 | 6 | 00:01:00:aa:bb:cc | 20000 | 500 | 233499999 |
| 3 | 192.168.1.34 | 5000 | 132.146.70.61 | 5000 | 17 | 00:01:00:aa:bb:cc | 100000 | 100000 | 233500001 |

In the above, IP flow #1 is an HTTP connection between device 7a and remote device 15a;

IP Flow #2 is a SIP VOIP TCP control connection between device 7b and remote device 15b; and IP flow #3 is a SIP VOIP RTP media streamer connection between device 7b and remote device 15b.

As shown above, each entry in the flow record store 83 contains:

A flow identity number;
An IP address of a local device
A port of the local device;
An IP address of the remote device;
A port of the remote device;
A protocol identifier;
A source MAC address;

The total number of bytes detected in the flow;

The total number of data packets transferred in the flow;

A timestamp of the most recent packet.

The last entry, the timestamp of the most recent packet, is used to identify which flows are active and which ones are idle or expired. For example, if the difference between the current time and the most recent packet in a flow is greater than 10 minutes then that flow is marked as inactive and is not analyzed by the other components of the interference detection component 35 to reduce processing load.

The matching processor 85 processes the flows in the IP Flow record store 83 to identify potential interferer devices attached to the home network 5. The identification is carried out in accordance with data stored in the rule templates store 87 which contains matching criteria supplied by the interference mitigation component 37. As will be explained later, the matching rules relate to the attributes of known interference sources.

In the example of FIG. 4, the matching processor does not find any matches, and therefore no further action is taken by the matching processor 85 or the interference detection component 35.

However, when the LTE femtocell 27 is connected to the network as shown in FIG. 5, the IP Flow processor 81 will analyze the packet flows and add a new entry into the IP flow records store 83 as shown below:

| Flow ID | Src IP | Src Port | Dest IP | Dest Port | Proto | Src MAC | Total Flow Bytes | Total Flow Packets | Timeout of most recent packet |
|---|---|---|---|---|---|---|---|---|---|
| 1 | 192.168.1.128 | 8000 | 173.194.41.76 | 80 | 6 | 00:00:00:01:01:01 | 10000 | 100 | 233653721 |
| 2 | 192.168.1.34 | 4333 | 132.146.70.61 | 1701 | 6 | 00:01:00:aa:bb:cc | 20000 | 500 | 233658134 |
| 3 | 192.168.1.34 | 5000 | 132.146.70.61 | 5000 | 17 | 00:01:00:aa:bb:cc | 100000 | 100000 | 233659135 |
| 4 | 192.168.1.32 | 3000 | 195.232.248.148 | 1701 | 50 | Aa:bb:ee:01:01:03 | 10000 | 200 | 233710389 |

In this case, flow 4 represents the femtocell 27 connection to the mobile network gateway 25.

When the matching processor 85 next analyzes the flow records in flow store 83, it will compare the active flows against the rule templates stored in 87, each entry relating to a rule for identifying known interference devices. The matching processor 85 is configured to monitor the flow store 83 and is triggered to analyze the flow records when a change to the flow store 83 is detected, and also every 5 minutes after the last trigger to process changes in flow statistics and also to handle removal of expired flows.

An example of the rule templates is shown below:

| Template ID | Source IP | Source Port | Destination IP | Dest Port | IP Protocol | Source MAC | Optional packet threshold |
|---|---|---|---|---|---|---|---|
| 0 | * | * | * | * | * | 00:01:02:*:*:* | 50 |
| 1 | * | * | 195.232.248.148 | 1701 | 50 | * | 0 |
| 2 | * | * | 54.194.218.211 | 1701 | 50 | * | 0 |

In this embodiment, the IP flow processor analyzes flows from devices connected to the wireless access point 3 via the Wi-Fi interface 71, the Ethernet interface 73 and the WAN interface 75.

For the purposes of the first embodiment, the IP flow records 83 contain the identity of pairs of devices in communication of each other over a given time period.

In the above table, at least one of the entries will contain a matching rule while the other entries are wildcards. Template 0 contains a partial MAC address rule, devices having this partial address are known to be LTE femtocells. Templates 1 and 2 are IP addresses of mobile network gateways 25. Any flows which terminate at either of the gateway addresses are assumed to be LTE femtocells 27 or similar devices.

The rules in this embodiment also include an optional packet/byte threshold which the flow packet count must exceed before the rule is deemed to be a match. In some cases, the interference effect may be dependent on the rate of traffic generated by the interferer and low levels of usage may be ignored.

Using the above template rules, the matching processor 85 will determine that the attributes of flow 4 match rule 0 and rule 1 and that therefore this flow and the device associated with the flow is carrying LTE data which may interfere with Wi-Fi devices on the same network 5 and lead to increased Wi-Fi transmission errors.

The details of the matched rule(s) are placed into the interferers list 89 along with details of the type of hub 3, firmware versions and timestamps. An example of the interferers list is shown below:

| Access point type | Firmware | Last Update Timestamp | Active Interferer rule(s) Triggered | Changed |
|---|---|---|---|---|
| HomeHub 4 | 6.1.2 | 0 | 0, 1 | Yes |

The access point type and firmware version is included in the list since the mitigation action for dealing with the interference may differ in dependence on the type of wireless access point 3.

To save processing, at each identifying cycle, the matching processor 85 also compares the new matched list against the old list previously stored in the interferer list 89 and sets the changed field accordingly. If there is no change, then subsequent processing is not performed.

If there has been a change, for example a new matched rule has appeared (indicative of a new interferer/femtocell) or a matched rule is no longer present (an old interferer has been removed), then the matching processor forwards the list to the interference mitigation notifier 91. The interference mitigation notifier 91 sends the updated list to the interference mitigation function 37.

Once a status message has been sent by the interference mitigation function 37 of the interference detection component 35, the mitigation action processor 93 of the hub 3 waits for a response from the interference mitigation component 37. The response will contain configuration information for adjusting the hub 3 so that the effect of LTE interference on the network 5 can be mitigated by reconfiguring operational aspects of the hub 3 such are wireless channel, transmission power etc.

Management Server

In this embodiment, a hub 3 is configured to communicate with the interference mitigation component 37 located in the ISP network core 13 in order to mitigate the effects of interference on Wi-Fi caused by devices such as LTE transmitters.

It has been observed that the effect of LTE interference on a Wi-Fi receiver is dependent on a number of factors:

It is inversely proportional to the physical distance separation between the LTE transmitter and the victim Wi-Fi receiver;

It is proportional to the transmit power of the LTE devices;

The received Wi-Fi signal power is inversely proportional to the distance between the Wi-Fi transmitter and receiver;

The adjacent channel rejection performance of the Wi-Fi receiver—i.e. its ability to filter out transmissions outside the Wi-Fi frequency band;

The LTE uplink and Downlink frequencies—since some LTE frequency configurations are closer to the Wi-Fi band and hence are more likely to interfere;

The implementation of the Wi-Fi rate adaption algorithm—different rate control algorithms react differently to interference. Some will treat interference as an intermittent condition and will try to keep using high data rates since they expect the interference to be short-lived. These rate control algorithms will behave poorly when long lived interferers such as LTE femtocells are the interference source.

The interference mitigation component 37 is responsible for identifying the type of interference that a hub 3 may be experiencing, or about to experience, and based on the determined conditions, identifying an action that the mitigation action processor 93 of the hub 3 can take in order to mitigate the interference.

Figure 8:
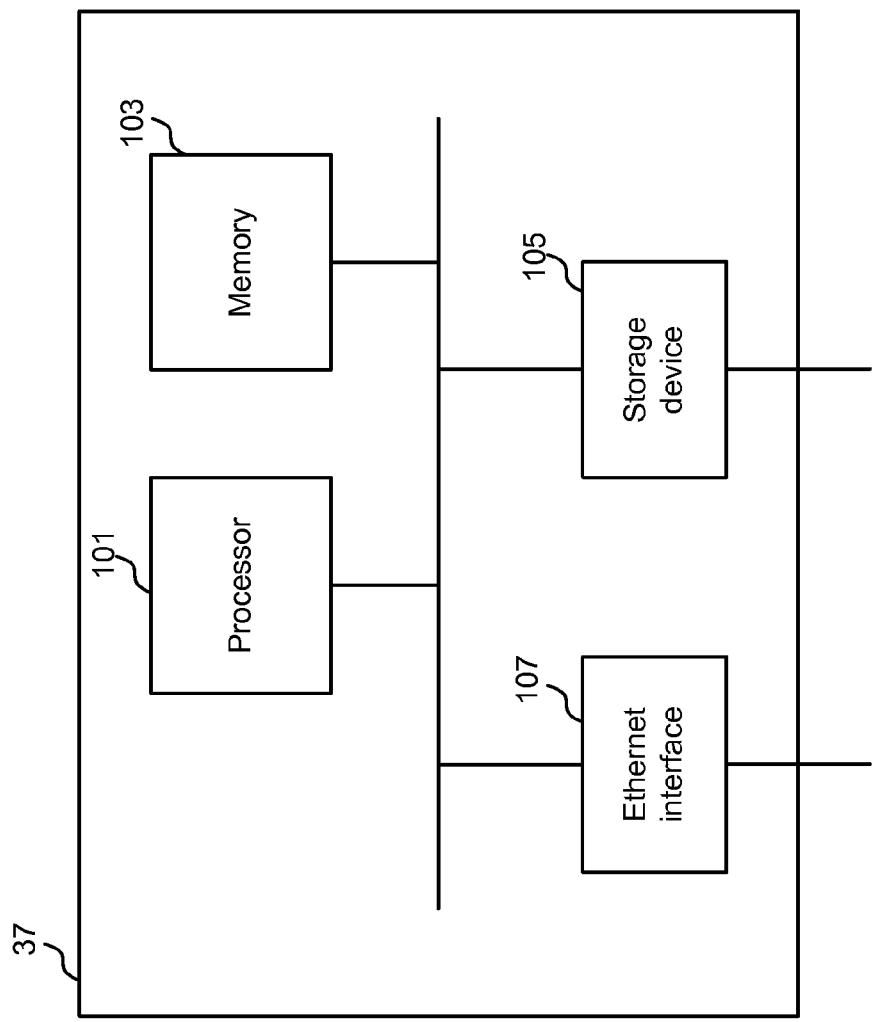
FIG. 8 illustrates the physical components of an interference mitigation component server located in the core of the network.

FIG. 8 shows the physical components of the interference mitigation component 37 according to the first embodiment. As shown, the interference mitigation component 37 is embodied as a management server containing a processor 101, working memory 103, a persistent storage device 105 such as a hard drive or solid state disk, and a network interface 107 such as Gigabit Ethernet for communication with hubs 3 via the ISP network 13.

When computer implemented instructions stored in the persistent data store 105 are executed by the processor 101, the operation of the interference mitigation component 37 can be regarded as a number of functional units operating in accordance with the first embodiment.

Figure 9:
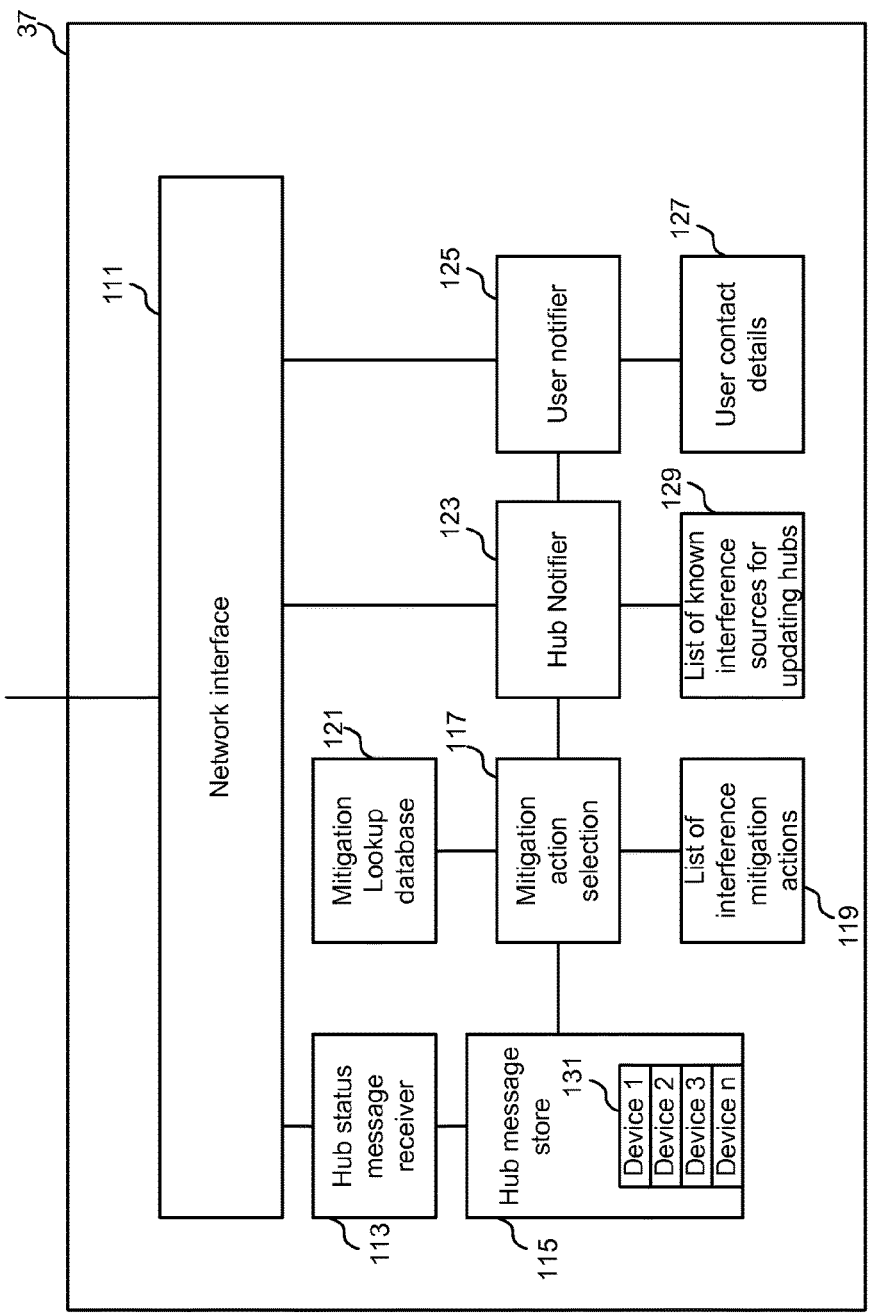
FIG. 9 illustrates the physical components of an interference mitigation component server located in the core of the network.

FIG. 9 shows the functional units of the interference mitigation component 37. The interference mitigation component 37 contains a network interface 111, a hub status message receiver 113, a hub message store 115, a mitigation action selector 117, a list of possible interference mitigation actions 119, a mitigation lookup database 121, a hub notifier 123, a user notifier 125, a data store containing user contact details 127 and a list of known interference sources 129.

Hub status messages sent by the interference mitigation notifier 91 within the interference detection component 35 of each hub 3 to the management server 17 are received by the hub status message receiver 113. Status information is stored in the hub message store 105 as a hub status entry 131. The interference mitigation component 37 is configured to mitigate interference for multiple hubs 3 and therefore the hub message store 105 will typically contain several entries relating to different hubs 3.

The hubs do not synchronize the sending of status messages and therefore status messages can be received at any time by the hub status message receiver 113 and stored as a hub status entry 131.

The mitigation action selector 117 is configured to periodically, for example every 10 minutes, analyze the status message entries 131 stored in the hub message store 115 to identify the type of interference each hub 3 is experiencing and in turn provide a mitigation action for the hubs 3 so that they can mitigate and possibly eliminate the effects of the LTE interference.

The mitigation action processor 117 uses the mitigation lookup database 121 to match triggered interference rules contained in the hub status entries 131 to mitigation actions stored in the list of mitigation actions 119.

The list of mitigation actions 119 contains the set of available mitigation actions as defined by a system administrator. In the first embodiment, the mitigation actions are defined as follows:

| AP Mitigation Action | Description | Comment |
|---|---|---|
| AP0 | Change Wi-Fi Configuration | Changing to a different frequency e.g. channel 11 to channel 1 may provide improved resilience to LTE Band 7 |
| AP1 | Enable Interference Detected Indication - Admin page | Displays a warning page on the Access Point web admin page |
| AP2 | Enable Interference Detected Indication - Hub light | Enable a LED warning light on the Wi-Fi access point |
| AP3 | Install firewall rule | Install a new firewall rule to block or restrict the interferer traffic |
| AP4 | Apply rate limit | Install a throughput rate limit on the interferer traffic flow to limit its interference effect |
| AP5 | Change Wi-Fi driver parameter. E.g. short/long retry, RTS threshold, Max AMPDU, as well as proprietary chipset specific parameters | A change to the configuration of the Wi-Fi driver e.g. reduced number of retries, reduced use of frame aggregation to reduce the impact of the interference, increased Tx power. Different Wi-Fi chipsets may provide proprietary noise immunity features which can be enabled. |
| AP6 | Initiate firmware upgrade | Start the firmware upgrade process |

As shown the actions can be generally split into 2 classes, reconfiguring the wireless operational characteristics of the hub 3; and indirectly affecting the operation of the potentially interfering device by limiting the flow of data from the LTE device 27.

In some cases, the selected mitigation action also requires a degree of user action such as moving the interfering device further away from the hub and therefore the list of interference mitigation actions 119 also contains user alerting actions.

| User mitigation action | Description |
|---|---|
| User0 | Email owner at their registered address |
| User1 | SMS owner at registered mobile/fixed phone number |
| User2 | In-app message via Apple Push notification or Google Cloud to device messaging |

The mitigation lookup database 121 contains entries which allow the mitigation action processor 117 to match triggered rules to actions. An example database is shown below. The database can be periodically updated by a system administrator to include new equipment entries and also to reconfigure the mappings.

| Hub Type | Firmware | Interferer rule triggered | Mitigation actions | Priority |
|---|---|---|---|---|
| 4a | * | 0 | AP2 | 1 |
| 4a | * | 1 | AP0 | 3 |
| 4a | * | 2 | AP5, User0 | 2 |
| 5a | 6.1 | 0 | AP6 | 1 |
| * | * | 1 | AP5 | 2 |
| 3a | * | * | AP3, AP1 | 1 |

The mitigation action processor 117 uses the hub type in the hub status entry 131 as the index into the database followed by the firmware version. Next the triggered rules are identified before locating an appropriate mitigation action.

Since several rules can be triggered and therefore contained in the hub status message, the mitigation action processor identifies all of the entries in the mitigation lookup database which match the triggered rules. Since this may lead to different mitigation actions, in this embodiment, to avoid too many, and possibly conflicting, reconfiguration actions, each entry in the mitigation lookup database 121 has a priority and the mitigation action processor 117 is configured to only select the action with the highest priority for the hub configuration.

For example, in the case of the hub status entry 131 indicating that rule 1 was triggered, the potentially interfering device 27 is connected to a mobile network gateway 25. Since the IP address of the mobile network gateway 25 is known, the LTE frequency configuration being used by the femtocell can be determined because the LTE licensed frequencies are publically known.

In the example for this mobile gateway 25 e.g. Vodafone, the action in the mitigation lookup database 121 is to change the Wi-Fi channel to maximize the spectral distances. In the case of another gateway, for example EE, using a close LTE frequency, then a mitigation solution involving physical separation of the femtocell and wireless access point will be necessary.

The mitigation action processor 117 takes the selected mitigation action as determined from the highest priority mitigation lookup entry. The selected action is passed to the hub notifier 123 which sends instructions to the relevant hub 3. These instructions may be supplied to the AP either as a response to the initial sending of the hub status message which is an http request or may be applied by other access point configuration management systems such as TR 069 based hub configuration.

If any user actions are included in the selected mitigation action, the hub notifier 123 passes that action to the user notifier 125. The user notifier 125 contains relevant applications for sending emails, sending text messages and notifying the user using details stored in the user contact details store 127.

Implementing the Mitigation Action

Returning to FIG. 7, the message from the hub notifier 123 is received by the mitigation action processor 93 of the interference detection component 35.

The mitigation action processor 93 interprets the instruction and changes the configuration of the hub to mitigate the potential interference. Typically this is by changing operating parameters of the wireless interface.

Updates

The rules used by the interference detection component 35 of the hub 3 are stored in the interferers list 89. These are periodically updated as new interferers discovered. Returning to FIG. 9, the interference mitigation component 37 contains a list of known interference sources 129 which is updated by a system administrator to allow new interferers to be detected so that a mitigation action can be selected.

The list is periodically sent out to the hubs 3 by the hub notifier 129. This message is received by the mitigation action processor 93 which then updates the rule templates 87 for that hub 3.

Flowcharts

Figure 10:
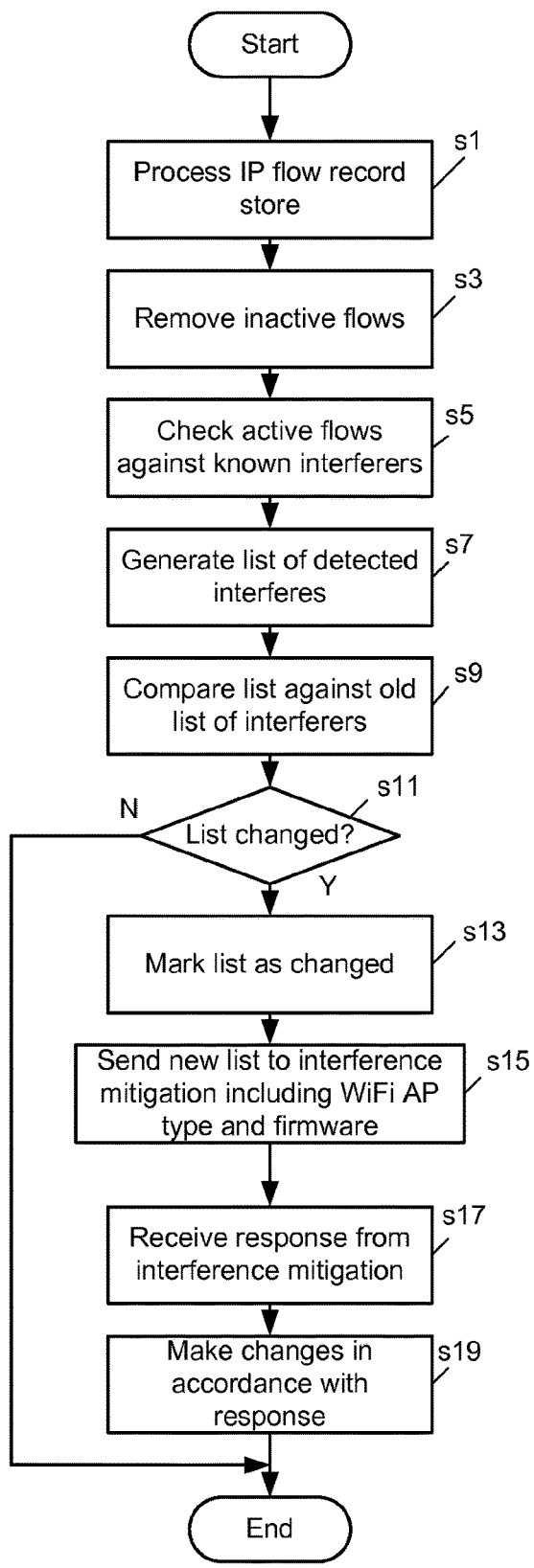
FIG. 10 is a flowchart showing the operation of the interference detection component.

FIG. 10 shows a flowchart of the operation of the interference detection component 35 of the hub 3 in accordance with the first embodiment. In s1, the IP flow processor 81 processes the current IP flows being carried by the packet routing 41 of the hub and stores them in the IP flow records 83. s1 is carried out whenever a new flow is detected, and also periodically so that the IP flow information is current. In s3 any inactive flows are removed from further consideration.

In s5, the matching processor 85 compares the list of active flows against the information in the rules template 87 to identify possible interferers 27 connected to the hub 3 and generates a list of matched interference in s7. The results are stored in the interferers list 89. To reduce processing, in s9, the matching processor 85 also compares the generated list against the old list of interferers to detect changes compared with the previous detection. A test is performed in s11 to determine whether any changes were detected in s9. If there are no changes, then processing ends. However, if the list has changed, then this is indicative that an interference source has been added, or has been removed from the home network 5. Therefore the interference mitigation component should be informed so that a new mitigation solution can be determined based on the new interference environment of the home network 5.

In s13 the list is marked as changed by the matching processor 85 and then in s15 the interference mitigation notifier 91 receives the interference list and sends the list to the interference mitigation component 37.

After a time, in s17, the response from the interference mitigation component 37 and in s19 the mitigation action processor 93 processes the response and carries out the mitigation action instructions. Processing then ends for this analysis phase of the home network 5.

Figure 11:
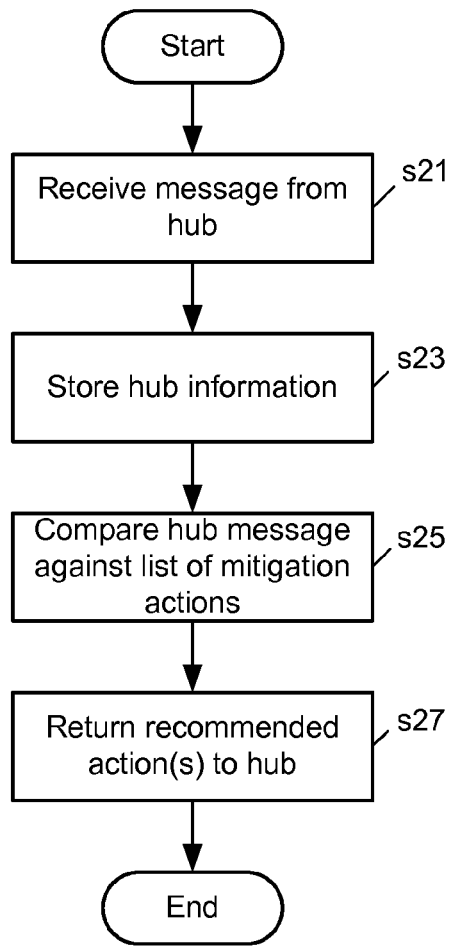
FIG. 11 is a flowchart showing the operation of the interference mitigation component.

FIG. 11 is a flowchart showing the processing of the interference mitigation component which is located in the ISP network core 13 in the first embodiment.

In s21, the hub status message receiver 113 receives a message from the interference mitigation notifier 91 of a hub 3. In s23, the received hub status information is stored in hub message store 115 with other hub message stores 131.

In s25, the mitigation action selector 117 processes the hub messages 131 in accordance with the mitigation lookup database 121 and the list of interference mitigation actions 119 to identify the type of interference and identify a mitigation instruction for the hub 3 respectively.

In s27, the hub notifier 123 sends mitigation messages to the hub 3 and processing ends for that particular hub.

Summary of the First Embodiment

In the first embodiment, a system is disclosed in which the interference detection component 35, located at the hub 3, uses inspection of IP traffic flows traversing the Wi-Fi access point/DSL modem/Broadband network to identify potential sources of interference within the home 1. The interference mitigation component 37 maintains a list of interference mitigation solutions and identifies whether the traffic flows traversing the hub are indicators of a potential Wi-Fi interference source and if so, determines a recommended mitigation action should be. The selected mitigation solution is then sent to either:

The access point for a configuration change; or
The owner/administrator of the access point.

The advantages provided by the system of the first embodiment include:

the ability to identify sources of interference within the home which are not visible to the Wi-Fi receiver in the AP but which can potentially affect the performance of other Wi-Fi devices in the home;
can perform the identification without requiring additional radio layer signal processing techniques;
does not require additional hardware changes and so can be deployed with legacy equipment;

Second Embodiment

In the first embodiment, the interference detection component is configured to determine whether there are any potentially inferring devices connected to a hub and the interference mitigation component determines an appropriate response to mitigate the interference. In cases where the hub is not connected to any interfering devices, that hub will not report any interfering devices to the interference management component.

However, where the hubs are in close proximity to each other, for example in densely populated areas, it is likely that the detected interference source affecting the connected hub will probably affect neighboring hubs too.

Figure 12:
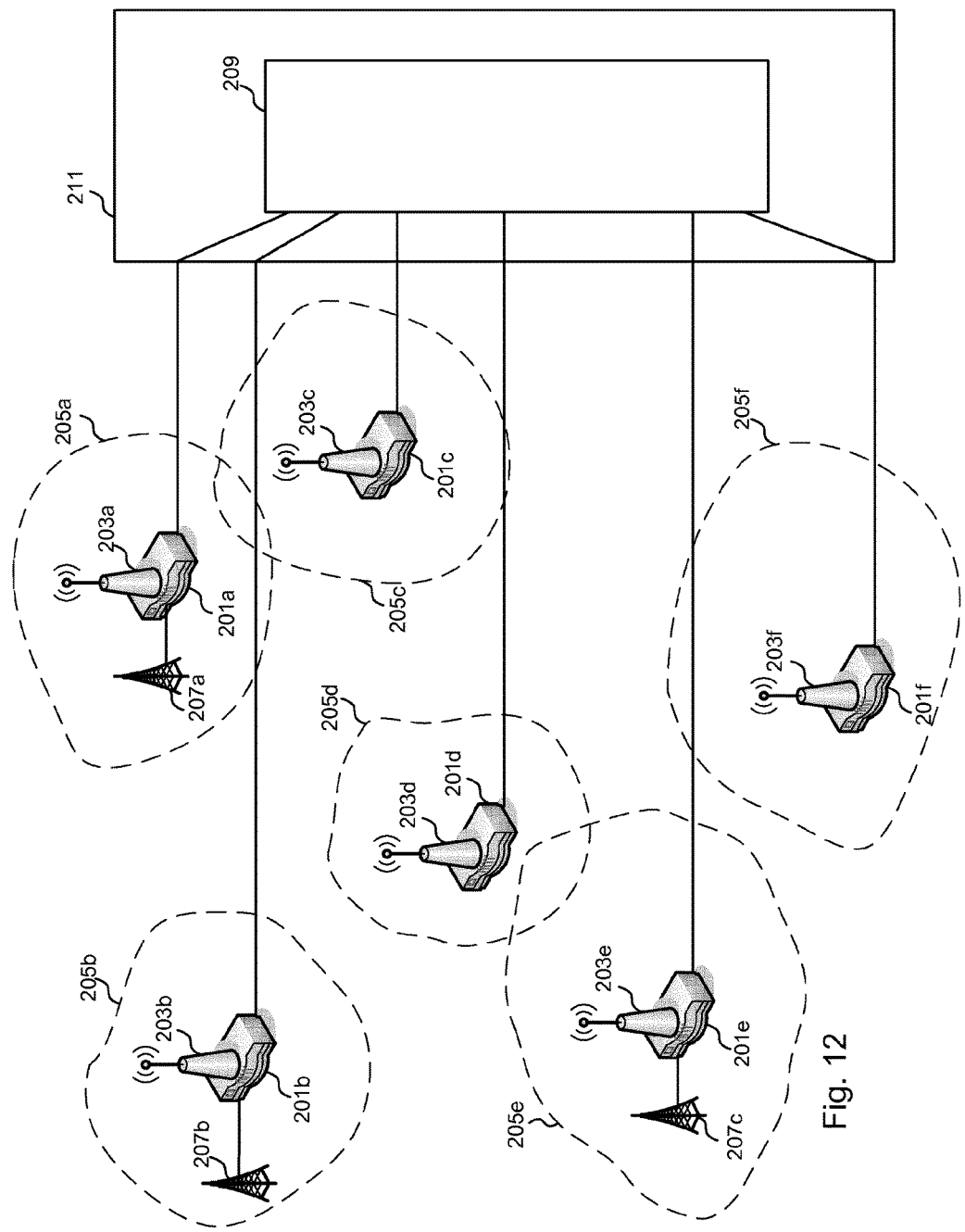
FIG. 12 illustrates an overview of a network system in accordance with a second embodiment.

FIG. 12 shows an example network system in the second embodiment.

In the network of FIG. 12, a number of hubs 201a-201f are shown having wireless access points 203 to generate wireless LANs 205. Some of the hubs 201a, 201b, 201e, also have small cells 207 attached to them. For example, a first hub 201a has a femtocell 207a, second hub 201b has a femtocell 207b and third hub 201e has a picocell 207c.

Each hub 201 carries out the processing as per the first embodiment in order to notify an interference mitigation component 209 located within the network core 211 as to whether a known interference device has been detected, i.e. an LTE small cell (femtocells and picocells).

Three of the hubs 201a, 201b, 201e will report the presence of an interferer since the processing of the interference detection component of each hub is the same as in the first embodiment. Subsequently, the interference mitigation component 209 will process the received interference message from each of the hubs 201a, 201b and 201e and send mitigation instructions to those particular hubs 201a, 201b, 201e which reported an interference source.

Therefore the configuration of hubs 201a, 201b, 201e which reported an interference source will be changed, for example by changing a configuration of the wireless access point 203a, 203b, 203e of each hub.

However, if a small cell has a range such that it can affect neighboring hubs, those hubs will not be able to report any interference sources. In the example system of FIG. 12, hub 201c is within range of the femtocell 207a attached to hub 201a, and hub 201d is within the range of the picocell 207e attached to hub 201e.

To address these hubs 201c, 201d, in the second embodiment, each hub 201 is arranged to scan the local wireless environment to detect the presence of surrounding hubs and then pass the scan results to the interference mitigation component 209 at the same time as sending an interference status message.

The interference mitigation component 209 is then arranged to determine whether the detected neighbor hub is likely to be affected by the interference and if so, to send that hub a mitigation action.

Figure 13:
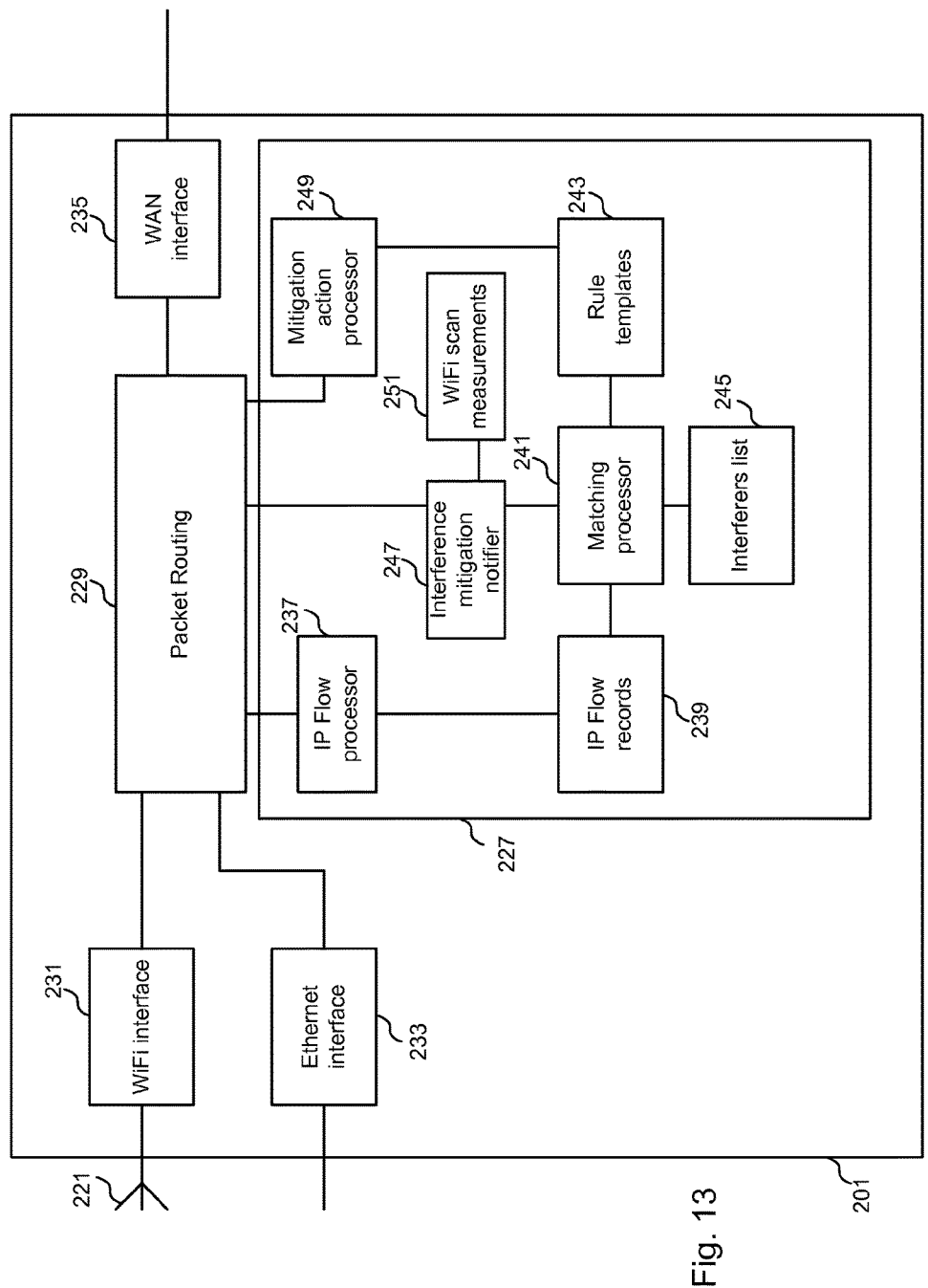
FIG. 13 illustrates the functional components of a wireless access point in the second embodiment.

FIG. 13 shows the functional components of each hub 201 in the second embodiment.

For external connections, the wireless access point 201 has a Wi-Fi interface 231 connected to an antenna 221, an Ethernet interface 233 and a WAN interface 235. A packet routing function 229 routes packets between the different interfaces.

In the first embodiment, the wireless access point 3 further includes the interference detection component 227 for the monitoring and detection of any potential interferers and performing mitigation actions as instructed by the interference mitigation function 209.

The interference detection component 227 includes an IP Flow processor 237, a store for the IP flow records 239. Additionally, there is a matching processor 241, a data store for rule templates 243 and a data store containing a list of previously matched interferers 245. An interference notifier 247 sends the interference mitigation component 209 details of any identified interferers and after processing by the interference mitigation component 209, the hub 201 receives instructions from the interference mitigation component 209 relating to mitigation actions based on the observed IP flows. A mitigation action processor 249 is provided to receive instructions via the WAN interface 235 and apply the instructions to various parts of the hub 201 in order to mitigate the detected interference.

The components of the hub 201 in the second embodiment are generally similar to their equivalent components in the first embodiment.

The interference mitigation notifier 247 differs only in that a registration process is carried out when the hub 201 is turned on to provide the interference mitigation component 209 details of that hub's BSSID, MAC address and current Wi-Fi operating channel frequency.

The Wi-Fi interface 231 is further configured to periodically switch into client mode and conduct a scan for surrounding hubs. For any observed access points, BSSID and signal strengths and Wi-Fi Channel Frequency are recorded and stored in a Wi-Fi scan store 251.

When the processing of the matching processor 241 determines that an interfering LTE small cell device is present, the hub status message is compiled and sent to the interference mitigation notifier 247. The interference mitigation notifier 247 is configured in this embodiment to send the list of detected surrounding hubs and the hub status message to the interference mitigation component 209.

Figure 14:
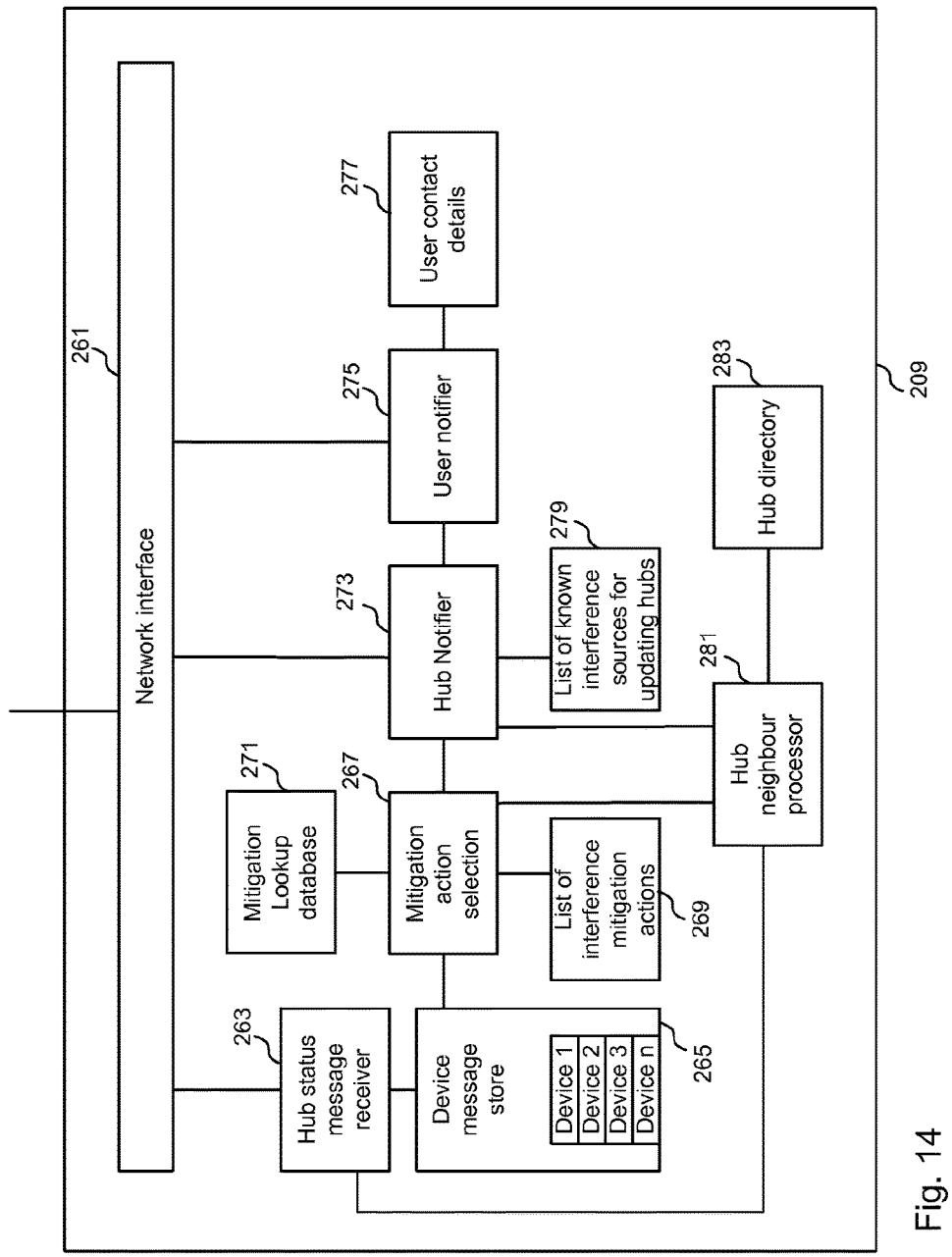
FIG. 14 illustrates the functional components of an interference mitigation component server in the second embodiment.

FIG. 14 shows the functional components of the interference mitigation component 209.

The interference mitigation component 209 is generally similar to the interference mitigation component 37 of the first embodiment. It has the same physical components as shown in FIG. 8 and similar functional components to those shown in FIG. 9. The interference mitigation component 209 of the second embodiment contains a network interface 261, a hub status message receiver 263, a hub message store 265, a mitigation action selector 267, a list of possible interference mitigation actions 269, a mitigation lookup database 271, a hub notifier 273, a user notifier 275, a data store containing user contact details 277 and a list of known interference sources 279. These components function in the same manner as the network interface 111, a hub status message receiver 113, a hub message store 115, a mitigation action selector 117, a list of possible interference mitigation actions 119, a mitigation lookup database 121, a hub notifier 123, a user notifier 125, a data store containing user contact details 127 and a list of known interference sources 129 of the interference mitigation component 37 respectively and therefore their operation will not be described again.

The interference mitigation component 209 also contains a hub neighbor processor 281 and a hub directory 283 to handle neighbor hubs.

The hub status message receiver 263 is further configured to receive the hub registration messages and store the messages into hub directory 283. Hub directory 283 therefore contains information relating to the BSSID and Wi-Fi operating channel of each connected hub even if they do not report interfering devices.

In accordance with the example system shown in FIG. 12, hub directory 283 contains the following information.

| Hub identifier | BSSID | MAC address | Wi-Fi frequency (Ghz) |
| --- | --- | --- | --- |
| Hub_201a | BTHub5-201a | MAC201a | 2.412 |
| Hub_201b | BTHub3-201b | MAC201b | 2.437 |
| Hub_201c | BTHub4-201c | MAC201c | 2.472 |
| Hub_201d | BTHub5-201d | MAC201d | 2.422 |
| Hub_201e | BTHub2-201e | MAC201e | 2.437 |
| Hub_201f | BTHub2-201f | MAC201f | 2.412 |

Any neighbor scan information is also stored into the device message store 265 for any hub which notifies the interference mitigation component 209 of interference.

For example, the entry for hub 201a would contain the following scan information.
ID—Hub_201a
Scan result 1
  BSSID—Hub_201c
  Signal Strength −50 dBm
  MAC Address—MAC 201c
  Channel Frequency 2412 MHz
The entry for hub 201b will contain the following scan information
ID—Hub_201b
Scan result 1
  [null]
The entry for hub 201e will contain the following information
ID— Hub201e
Scan result 1
  BSSID—Hub_201d
  Signal Strength −60 dBm
  MAC address—MAC 201d
  Channel Frequency 2462 MHz
Hubs 201b, 201d and 201f do not have entries since they are not connected to any interfering devices.

The hub neighbor processor 281 is responsible for determining whether any neighbor hubs are present and likely to be affected by an interference source associated with another hub. Considering the scan on hub 201a, the hub population processor will check whether a hub has been detected, in this case hub 201c, and then assess the signal strength and Wi-Fi channel frequency observed in the Wi-Fi scan. Since the strength is −50 dBm and the Wi-Fi frequency is close to e.g. a 2.3 GHz small cell 207a, the hub 201c is determined to be likely to be affected by the small cell 207a attached to hub 201a.

The hub neighbor processor 281 then generates a hub notification message, generally containing the same mitigation action as the action selected by the mitigation action selector 267, and the hub notifier 273 sends the generated hub notification message to the neighbor hub 201c via a standard hub remote management system such as TR069.

Similar processing will be carried out by the hub neighbor processor 281 for the sending a mitigation action to hub 203d.

In the second embodiment, the neighbors of hubs 201 to hubs having LTE interference sources 207 can be detected and a mitigation action can be sent to those neighbors in order to mitigate the effect of nearby LTE interference which would not be detected in the first embodiment.

Third Embodiment

In the third embodiment, the interference mitigation component is located within the network core and is configured to perform hub processing as in the first embodiment for connected hubs, but is further operable to detect hubs which may be affected by a neighbor hub's small cell. The interference mitigation component includes additional processing to determine the geographical location of the connected hubs and apply group processing of the connected hub interference information so that mitigation information can be sent to groups of neighboring hubs.

Figure 15:
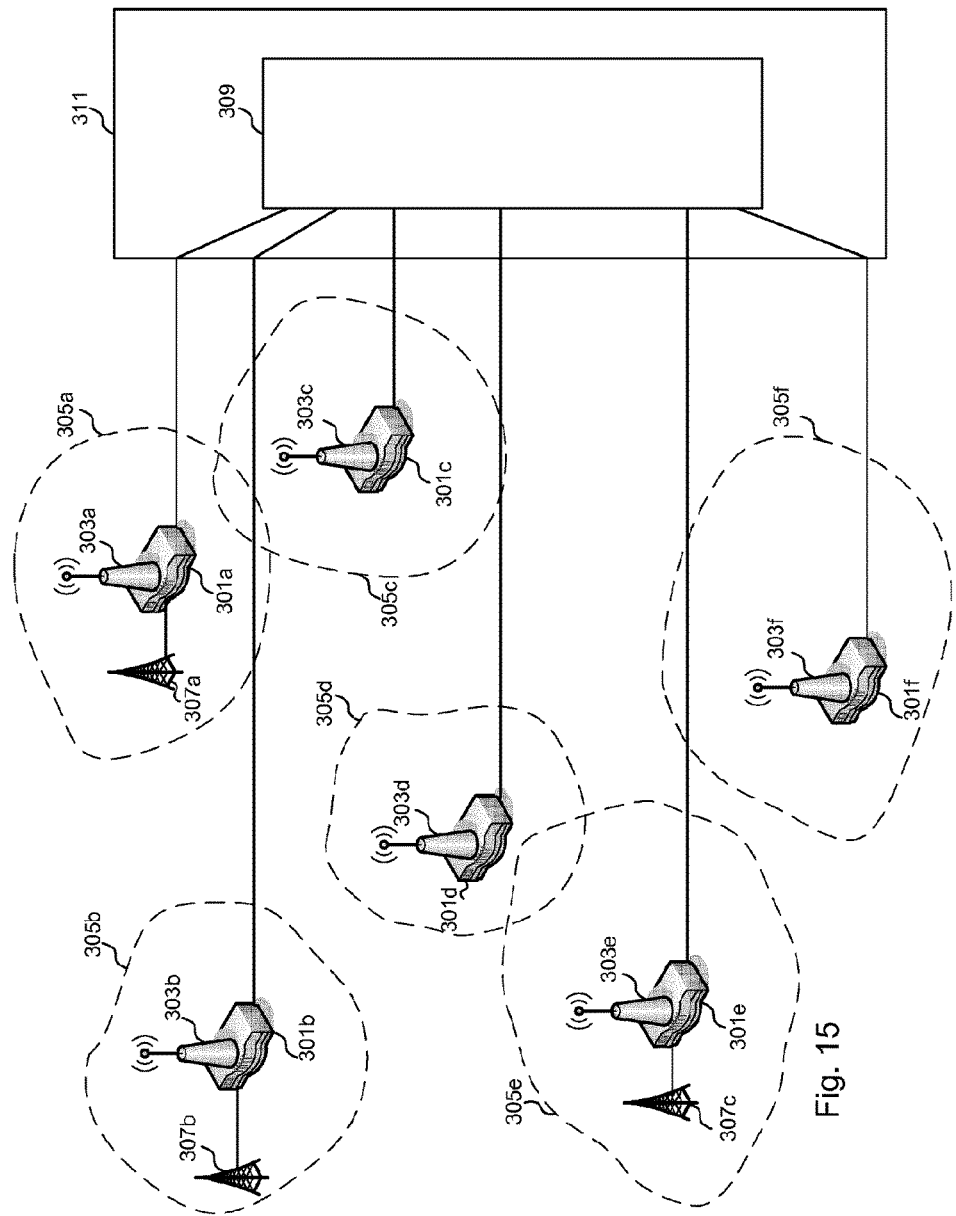
FIG. 15 illustrates an overview of a network system in accordance with a second embodiment.

FIG. 15 shows an overview of the network system in the third embodiment.

In the network of FIG. 15, which is similar to the network shown in FIG. 12 of the second embodiment, a number of hubs 301a-301f are shown having wireless access points 303 to generate wireless LANs 305. Some of the hubs 301a, 301b, 301e, also have small cells 307 attached to them. For example, a first hub 301a has a femtocell 307a, second hub 301b has a femtocell 307b and third hub 301e has a picocell 307c.

Each hub 301 carries out the processing as per the first embodiment in order to notify an interference mitigation component 309 located within the network core 311 as to whether a known interference device has been detected, i.e. an LTE small cell (femtocells and picocells).

Three of the hubs 301a, 301b, 301e will report the presence of an interferer since the processing of the interference detection component of each hub is the same as in the first embodiment. Subsequently, the interference mitigation component 309 will process the received interference message from each of the hubs 301a, 301b and 301e and send mitigation instructions to those particular hubs 301a, 301b, 301e which reported an interference source.

Therefore the configuration of hubs 301a, 301b, 301e which reported an interference source will be changed, for example by changing a configuration of the wireless access point 303a, 303b, 303e of each hub.

However, if a small cell has a range such that it can affect neighboring hubs, those hubs will not be able to report any interference sources. In FIG. 15, hub 301c is within range of the femtocell 307a attached to hub 301a, and hubs 301d and 301f are within the range of the picocell 307e attached to hub 301e.

In the third embodiment, the interference mitigation component 309 is configured to identify such situations where a small cell 307 may cause interference to its attached hub 301 and also to neighboring hubs 301.

In response to this identification, the interference mitigation component will push mitigation instructions to those affected hubs so that they can, for example, alter their wireless access point configuration.

In this way, the interference mitigation component 309 provides a centralized interference mitigation function for a population of hubs 301.

The hubs 301 are configured with the same components as described in the first embodiment, the interference detection component 35 of each hub also operates in the same manner as described in the first embodiment with the exception that hubs perform a simple registration process at start up to log their MAC and IP address with the interference mitigation server 309 in the manner described in the second embodiment.

Figure 16:
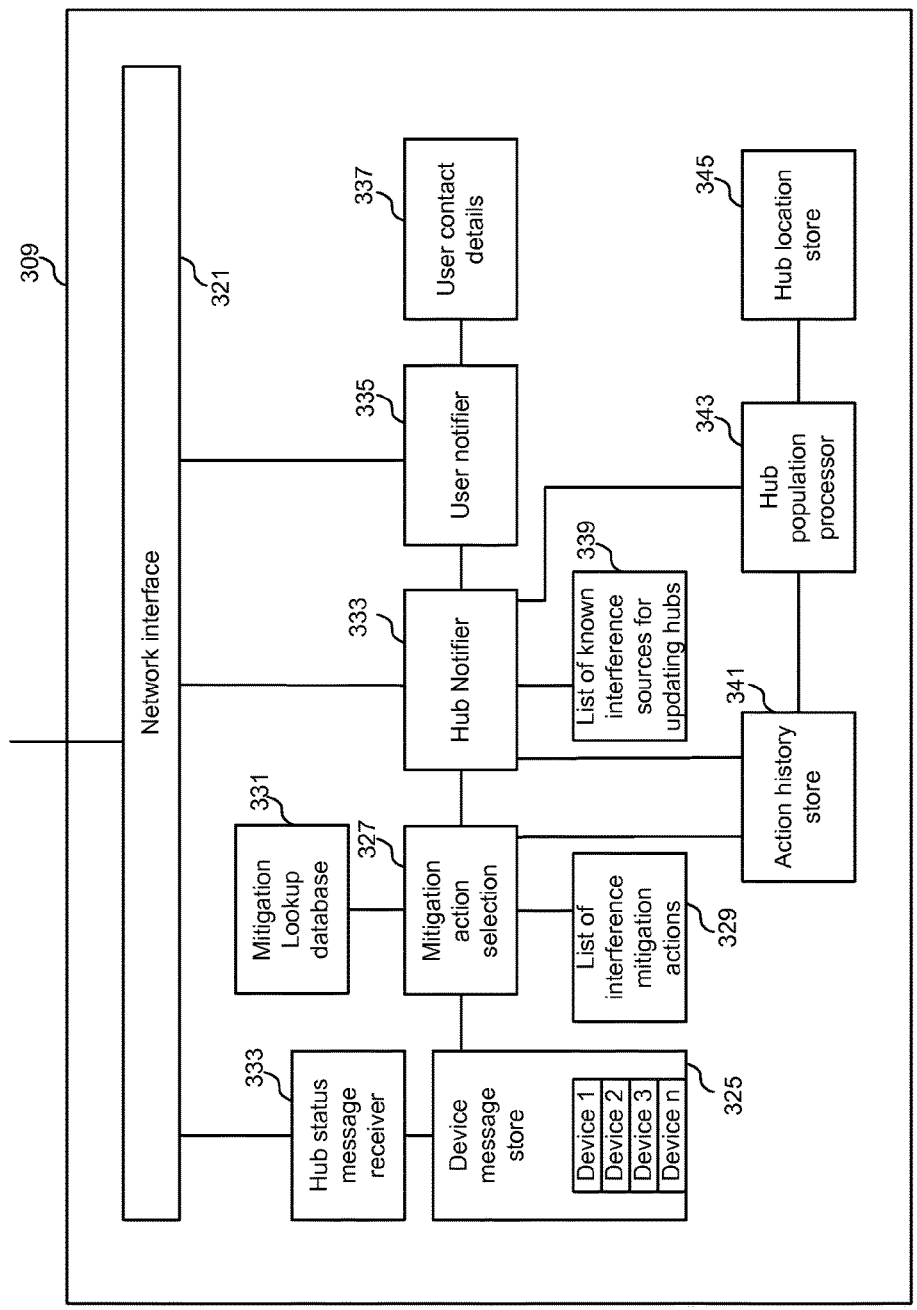
FIG. 16 illustrates the functional components of an interference mitigation component server in the third embodiment.

FIG. 16 shows the functional components of the interference mitigation component 309 in the third embodiment.

The interference mitigation component 309 is generally similar to the interference mitigation component 37 of the first embodiment. It has the same physical components as shown in FIG. 8 and similar functional components to those shown in FIG. 9. The interference mitigation server 309 of the third embodiment contains a network interface 321, a hub status message receiver 323, a hub message store 325, a mitigation action selector 327, a list of possible interference mitigation actions 329, a mitigation lookup database 331, a hub notifier 333, a user notifier 335, a data store containing user contact details 337 and a list of known interference sources 339. These components function in the same manner as the network interface 111, a hub status message receiver 113, a hub message store 115, a mitigation action selector 117, a list of possible interference mitigation actions 119, a mitigation lookup database 121, a hub notifier 123, a user notifier 125, a data store containing user contact details 127 and a list of known interference sources 129 of the interference mitigation server respectively and therefore their operation will not be described again.

In the third embodiment, the interference mitigation component 309 includes an action history store 341, a hub population processor 343 and a hub location store 345.

The action store history 343 contains a log of the output of the mitigation action processor 327 for all hubs. Each time the mitigation action processor 327 generates a new action for a particular hub 301, the output is sent to both the hub notifier 333 and the action store history 343.

In accordance with the system of FIG. 15, the action store history 343 may contain:

| Timestamp | Hub ID    | Action |
|-----------|-----------|--------|
| TS 1      | hub_301a  | AP2    |
| TS240     | hub_301b  | AP5    |
| TS278     | hub_301e  | AP1    |

The hub location store 345 contains information relating to the geographic location of all the connected hubs. This location information is populated in advance, for example by a system administrator for each connected hub using customer address information or by receipt of position information (determined by built in GPS or using Wi-Fi fingerprinting techniques) from a mobile app running on a mobile device connected to a hub. Each entry also contains the current IP and MAC address pairs received during hub registration.

In the system of FIG. 15, the hub population store 345 may contain:

| HubID    | IP address | MAC        | Location          | Type |
|----------|------------|------------|-------------------|------|
| Hub_301a | HubIP301a  | HubMAC301a | coordinate pair_a | Hub5 |
| Hub_301b | HubIP301b  | HubMAC301b | coordinate pair_b | Hub2 |
| Hub_301c | HubIP301c  | HubMAC301c | coordinate pair_c | Hub3 |
| Hub_301d | HubIP301d  | HubMAC301d | coordinate pair_d | Hub4 |
| Hub_301e | HubIP301e  | HubMAC301e | coordinate pair_e | Hub3 |
| Hub_301f | HubIP301f  | HubMAC301f | coordinate pair_f | Hub2 |

The hub population processor 343 is configured to analyze the mitigation action store 341, for example every 15 minutes, or as each new entry is created, to create a list of active hubs 301 which have been sent mitigation actions.

As mentioned above, the mitigation action processor 327 will have already sent mitigation instructions to the hubs which have indicated a new interferer has been detected on that hubs home network. However, hubs which are nearby these affected hubs will not detect any interferers but may nonetheless suffer interference.

The hub population processor 343 therefore sends a request to the hub location store 345 containing the list of IP addresses of hubs affected by interference in order to retrieve the identity of hubs which are located near to those affected hubs.

In the example scenario shown in FIG. 15, when the hub population processor 343 sends a request to the hub location store 345 to retrieve the identity of hubs close to hubs 201a, 201b and 201e, the hub location store 345 would retrieve the following results.

| Input hub | Nearby hubs |
|---|---|
| hub 301a | hub 301c |
| hub 301b | none |
| hub 301e | hub 301d, hub 301f |

The definition of nearby used by the hub location store 345 can vary in dependence on the type of interference device detected. For example, femtocells 307a and 307b have short ranges and therefore 10 m is the expected range. Therefore the hub location store would only search for hubs within 10 m of the affected hub 301a. However, hub 301e is attached to a picocell 307c which has a range of up to 200 m and therefore the threshold for "nearby" is greater.

The type of hub is also considered by the hub location store 345 since older hubs are more susceptible to interference than modern hubs.

Once the list of nearby hubs has been retrieved, the hub population processor 343 sends mitigation instructions to the identified neighbor hubs via the hub notifer 333. In this embodiment, the mitigation instruction is the same as the instruction identified by the mitigation action processor 327.

The processing in this embodiment is intensive on the resources of the interference mitigation component 309 due to the identification of nearby hubs in the hub location store 345. However, with the processing of the interference mitigation component 309 in the third embodiment, further hubs possibly affected by LTE cells can have their configuration altered compared with detection based on what other access points a hub can detect. For example, in this embodiment, the configuration of hub 301f will be changed since it is deemed to be close to the interference of hub 301e. This neighbor is a contrast to the second embodiment, where the equivalent to hub 301f would not have been detected as a possible neighbor because it is outside the scannable Wi-Fi range of the hub 301e.

Alternatives and Modifications

In the embodiment, the interference detection component is located at the hub and the interference mitigation component is located at a server in the network core.

Other configurations are possible while still falling within the scope of the disclosure. In a first alternative, the interference detection component, including flow detection, is implemented remotely in a server in the ISP network core rather than in the hub. This reduces the processing requirements at the hub at the expense of more control data transfer over the broadband connection.

Each hub only requires a mitigation action receiver. The rest of the interference detection component and interference mitigation component functions are performed at the server for all hubs.

In a further alternative, the interference detection component and the mitigation processing component are both implemented at each hub. In this way, each hub is capable of detecting and resolving interference devices connected to the local area network of the hub. The local processing allows the resolution to be implemented more quickly compared to the previous embodiments. A management server is only required to store the master set of interferer detection rules and the set of mitigation actions. The updated data in these stores is periodically pushed to each hub.

In the embodiment and above alternatives, the detection of potentially interfering devices is performed by analyzing the IP flows. Such processing can detect potentially interfering devices which are connected to the home network, but cannot detect other sources of LTE interference. For example the LTE macrocell 19 which is operating at the 2.6 GHz frequency and therefore can interfere with 2.4 Ghz Wi-Fi. The processing of the above embodiments will not detect the macrocell 19. In an alternative, the hub includes, or is connected to, dedicated wireless signal sensing hardware located on the home network which uses air wave scanning techniques to detect interferers. This information is used to supplement the interference detection component to detect more sources of interference.

Alternatively, mobile devices having both LTE and Wi-Fi capabilities could be used to scan the surrounding area for macrocells and Wi-Fi neighbors. A mobile application installed on the mobile device can be configured to record any observed LTE cells, both macro and small, and Wi-Fi signals, along with signal strength and forward the collected information to the interference mitigation component.

In a further modification, the interference mitigation component will access location information regarding the location of the macrocells in order to identify hubs which may be affected by LTE interference caused by the macrocell. The macrocell information can be included in the mitigation selection stage to determine an appropriate mitigation action.

In the second embodiment, the neighbor detection is carried out on the basis of Wi-Fi scans performed by the hubs and reported to the interference mitigation component to detect relative positions between a hub and its neighbors. In the third embodiment, neighbors are detected based on knowledge of the absolute position of the hubs. In an alternative, a combination of relative and absolute positioning is used based on the second and third embodiment so that immediate neighbors can be quickly updated with mitigation action, while the slower and more processing intensive neighbor search can be implemented later.

In the embodiments, the small cells are connected to the hubs via the Ethernet interface so that LTE cellular data transfer is from LTE devices to small cell via LTE, then from the small cell to the hub via Ethernet, and then from the hub to the network core via xDSL.

In an alternative, the small cell is connected to the hub via an alternate Wi-Fi frequency band or wireless data transfer protocol, e.g. 5 Ghz which offers increased bandwidth and reliability. In this way, the LTE cellular data transfer is from LTE devices to small cell via LTE, then from the small cell to the hub via Wi-Fi, and then from the hub to the network core via xDSL.

The invention claimed is:

1. A method of managing a wireless local area network access point device having a local area network interface for wireless and wired connections via a respective wireless network and wired network, and an interface to remote networks, the wireless local area network access point device being connected via the local area network interface to at least one cellular network base station device for providing cellular network connectivity to cellular network devices, the method comprising:
monitoring characteristics of flows of data packets traveling between the at least one cellular network base station device and a remote resource located on a remote network;
determining, based on the monitored characteristics, whether said at least one cellular network base station device is an interference device which can affect a wireless local area network environment of the wireless local area network access point device;
sending instructions to alter a configuration of the wireless local area network access point device in response to a determination that an interference device is present;
accessing a location data store storing a geographic location of each of the wireless local area network access point device and a second wireless local area network access point device to determine a relative geographic distance therebetween;
determining whether the interference device can affect a wireless local area network environment of the second wireless local area network access point device by comparing the determined relative geographic distance against a threshold; and
sending instructions to alter a configuration of the second wireless local area network access point device if the determination is made that the interference device can affect the wireless local area network environment of the second wireless local area network access point device.

2. The method according to claim 1, wherein the monitored characteristics include hardware device identifier information and logical network address identifier information of the devices forming end points of the flows of data packets, and wherein the at least one cellular network base station device is identified as an interference device when the flow characteristics match a set of characteristics relating to known interference devices.

3. The method according to claim 1, wherein the at least one cellular network base station device is connected to the wired network of the wireless local area network access point device.

4. The method according to claim 3, wherein the at least one cellular network base station device is a short range cell device operating in accordance with the Long Term Evolution (LTE) set of protocols.

5. The method according to claim 1, further comprising selecting a mitigation action from a set of stored mitigation actions.

6. The method according to claim 1, wherein the instructions to alter the configuration of the wireless local area network access point device and the second wireless local area network access point device are the same.

7. A non-transitory computer-readable storage medium storing a computer program comprising instructions that when executed by a computer apparatus control the computer apparatus to perform the method of claim 1.

8. An apparatus for managing wireless local area network access point devices, each wireless local area network access point device having a local area network interface for wireless and wired connections via a respective wireless network and wired network, and an interface to remote networks, the wireless local area network access point device being connected via the local network interface to at least one cellular network base station device for providing cellular network connectivity to cellular network devices, comprising:
a receiver for receiving status messages from a first wireless local area network access point device indicating that a first cellular network base station device is an interference device which can affect a wireless local area network environment of the first wireless local area network access point device;
a transmitter for sending instructions to alter a configuration of the first wireless local area network access point device in response to a status message that an interference device is present;
a data store storing a geographic location of each of the first wireless local area network access point device and at least one second wireless local area network access point device; and
a controller operable to:
access the data store to determine a relative geographic distance between the first wireless local area network access point device and the at least one second wireless local area network access point device, and
determine whether the interference device can affect a wireless local area network environment of the at least one second wireless local area network access point device by comparing the determined relative geographic distance against a threshold; and
wherein the transmitter is further operable to send instructions to alter a configuration of the at least one second wireless local area network access point device if the controller determines that the interference device can affect a wireless local area network environment of the second wireless local area network access point device.

9. The apparatus according to claim 8, further comprising monitoring characteristics of flows of data packets between the at least one cellular network base station device and a remote resource located on a remote network, wherein the monitored characteristics include hardware device identifier information and logical network address identifier information of the devices forming end points of the flows of data packets, and wherein the at least one cellular network base station device is identified as an interference device when the flow characteristics match a set of characteristics relating to known interference devices.

10. The apparatus according to claim 8, wherein the at least one cellular network base station device is a cellular communication device connected to the wired network of the wireless local area network access point device.

11. The apparatus according to claim 10, wherein the at least one cellular network base station device is a short range cell device operating in accordance with the Long Term Evolution (LTE) set of protocols.

12. The apparatus according to claim 8, further comprising selecting a mitigation action from a set of stored mitigation actions.

13. The apparatus according to claim 8, wherein the instructions to alter the configuration of the wireless local area network access point device and the at least one second wireless local area network access point device are the same.

* * * * *